(12) United States Patent
Wai et al.

(10) Patent No.: US 11,301,377 B2
(45) Date of Patent: Apr. 12, 2022

(54) ADDRESSING SCHEME FOR LOCAL MEMORY ORGANIZATION

(71) Applicant: Marvell Rianta Semiconductor ULC, Santa Clara, CA (US)

(72) Inventors: Alan Chi-Lun Wai, Markham (CA); Alexandre Zassoko, Markham (CA); Howard (Hao) Lu, Ottawa (CA)

(73) Assignee: Marvell Rianta Semiconductor ULC, Santa Clara, CA (US)

( * ) Notice: Subject to any disclaimer, the term of this patent is extended or adjusted under 35 U.S.C. 154(b) by 0 days.

(21) Appl. No.: 16/998,782

(22) Filed: Aug. 20, 2020

(65) Prior Publication Data
US 2022/0058126 A1 Feb. 24, 2022

(51) Int. Cl.
*G06F 12/06* (2006.01)
*G06F 12/02* (2006.01)

(52) U.S. Cl.
CPC .......... *G06F 12/06* (2013.01); *G06F 12/0207* (2013.01)

(58) Field of Classification Search
CPC .............................. G06F 12/06; G06F 12/0207
See application file for complete search history.

(56) References Cited

U.S. PATENT DOCUMENTS

| 6,088,743 | A | * | 7/2000 | Takeda | ...................... | G11C 7/22 710/52 |
| 2017/0357570 | A1 | * | 12/2017 | Edso | ................... | G06F 12/0207 |
| 2020/0278923 | A1 | * | 9/2020 | Jacob | ....................... | G11C 8/10 |

* cited by examiner

*Primary Examiner* — Chie Yew

(57) ABSTRACT

A memory tile, in a local memory, may be considered to be a unit of memory structure that carries multiple memory elements, wherein each memory element is a one-dimensional memory structure. Multiple memory tiles make up a memory segment. By structuring the memory tiles, and a mapping matrix to the memory tiles, within a memory segment, non-blocking, concurrent write and read accesses to the local memory for multiple requestors may be achieved with relatively high throughput. The accesses may be either row-major or column-major for a two-dimensional memory array.

11 Claims, 23 Drawing Sheets

| Bank | Entry | Sub-Bank 0 | 1 | 2 | 3 | 4 |
|---|---|---|---|---|---|---|
| 0 | 0 | 0 | 2 | 4 | 6 | 8 |
| 0 | 1 | 50 | 52 | 54 | 56 | 58 |
| 0 | 2 | 100 | 102 | 104 | 106 | 108 |
| 0 | 3 | 150 | 152 | 154 | 156 | 158 |
| 0 | 4 | 200 | 202 | 204 | 206 | 208 |
| 0 | 5 | 250 | 252 | 254 | 256 | 258 |
| 0 | 6 | 300 | 302 | 304 | 306 | 308 |
| 0 | 7 | 350 | 352 | 354 | 356 | 358 |
| 0 | 8 | 400 | 402 | 404 | 406 | 408 |
| 1 | 0 | 10 | 12 | 14 | 16 | 18 |
| 1 | 1 | 60 | 62 | 64 | 66 | 68 |
| 1 | 2 | 110 | 112 | 114 | 116 | 118 |
| 1 | 3 | 160 | 162 | 164 | 166 | 168 |
| 1 | 4 | 210 | 212 | 214 | 216 | 218 |
| 1 | 5 | 260 | 262 | 264 | 266 | 268 |
| 1 | 6 | 310 | 312 | 314 | 316 | 318 |
| 1 | 7 | 360 | 362 | 364 | 366 | 368 |
| 1 | 8 | 410 | 412 | 414 | 416 | 418 |
| 1 | 9 | 460 | 462 | 464 | 466 | 468 |
| 2 | 0 | 20 | 22 | 24 | 26 | 28 |
| 2 | 1 | 70 | 72 | 74 | 76 | 78 |
| 2 | 2 | 120 | 122 | 124 | 126 | 128 |
| 2 | 3 | 170 | 172 | 174 | 176 | 178 |
| 2 | 4 | 220 | 222 | 224 | 226 | 228 |
| 2 | 5 | 270 | 272 | 274 | 276 | 278 |
| 2 | 6 | 320 | 322 | 324 | 326 | 328 |
| 2 | 7 | 370 | 372 | 374 | 376 | 378 |
| 2 | 8 | 420 | 422 | 424 | 426 | 428 |
| 2 | 9 | 470 | 472 | 474 | 476 | 478 |
| 2 | 10 | 520 | 522 | 524 | 526 | 528 |
| 2 | 11 | 570 | 572 | 574 | 576 | 578 |
| 2 | 12 | 620 | 622 | 624 | 626 | 628 |
| 3 | 0 | 30 | 32 | 34 | 36 | 38 |
| 3 | 1 | 80 | 82 | 84 | 86 | 88 |
| 3 | 2 | 130 | 132 | 134 | 136 | 138 |
| 3 | 3 | 180 | 182 | 184 | 186 | 188 |
| 3 | 4 | 230 | 232 | 234 | 236 | 238 |
| 3 | 5 | 280 | 282 | 284 | 286 | 288 |
| 3 | 6 | 330 | 332 | 334 | 336 | 338 |
| 3 | 7 | 380 | 382 | 384 | 386 | 388 |
| 4 | 0 | 40 | 42 | 44 | 46 | 48 |
| 4 | 1 | 90 | 92 | 94 | 96 | 98 |
| 4 | 2 | 140 | 142 | 144 | 146 | 148 |
| 4 | 3 | 190 | 192 | 194 | 196 | 198 |
| 4 | 4 | 240 | 242 | 244 | 246 | 248 |
| 4 | 5 | 290 | 292 | 294 | 296 | 298 |
| 4 | 6 | 340 | 342 | 344 | 346 | 348 |
| 4 | 7 | 390 | 392 | 394 | 396 | 398 |
| 4 | 8 | 440 | 442 | 444 | 446 | 448 |
| 4 | 9 | 490 | 492 | 494 | 496 | 498 |

| Line # | Entry # | Firmware view of LM space Elements (8E per line) | Bank # | | Comments |
|---|---|---|---|---|---|
| 0 | 0 | 172 x 64 | 0 | Distance of 180 | Matrix start line (page boundary) |
| | | 0...7 | | | |
| 180 | 3 | 172 x 64 | 3 | Distance of 180 | |
| | | 8...15 | | | |
| 360 | 7 | 172 x 64 | 1 | Distance of 180 | |
| | | 16...23 | | | |
| 540 | 10 | 172 x 64 | 4 | Distance of 180 | |
| | | 24...31 | | | |
| 720 | 14 | 172 x 64 | 2 | Distance of 180 | |
| | | 32...39 | | | |
| 900 | 18 | 172 x 64 | 0 | Distance of 180 | |
| | | 40...47 | | | |
| 1080 | 21 | 172 x 64 | 3 | Distance of 180 | |
| | | 48...55 | | | |
| 1260 | 25 | 172 x 64 | 1 | Distance of 180 | |
| | | 56...63 | | | |
| 1440 | | Unused | | | |
| 1450 | 29 | 96 x 64 | 0 | Distance of 110 | Matrix start line (page boundary) |
| | | 0...7 | | | |
| | | Unused | | | |
| 1560 | 31 | 96 x 64 | 1 | Distance of 110 | |
| | | 8...15 | | | |
| | | Unused | | | |
| 1670 | 33 | 96 x 64 | 2 | Distance of 110 | |
| | | 16...23 | | | |
| | | Unused | | | |
| 1780 | 35 | 96 x 64 | 3 | Distance of 110 | |
| | | 24...31 | | | |
| | | Unused | | | |
| 1890 | 37 | 96 x 64 | 4 | Distance of 110 | |
| | | 32...39 | | | |
| | | Unused | | | |
| 2000 | 40 | 96 x 64 | 0 | Distance of 110 | |
| | | 40...47 | | | |
| | | Unused | | | |
| 2110 | 42 | 96 x 64 | 1 | Distance of 110 | |
| | | 48...55 | | | |
| | | Unused | | | |
| 2220 | 44 | 96 x 64 | 2 | Distance of 110 | |
| | | 56...63 | | | |
| | | Unused | | | |
| 2330 | | Unused | | | |
| 2350 | 47 | Next Matrix... | | | Matrix start line (page boundary) |
| 51199 | | Last line of segment | | | |

FIG. 3

| # OF ROWS % 5 | BANK JUMPING DISTANCE | 2nd EIGHT ELEMENTS | 3rd EIGHT ELEMENTS | 4th EIGHT ELEMENTS | 5th EIGHT ELEMENTS | 6th EIGHT ELEMENTS | BANK ACCESSES |
|---|---|---|---|---|---|---|---|
| 10 | 1 | {0+1}%5=1 | {1+1}%5=2 | {2+1}%5=3 | {3+1}%5=4 | {4+1}%5=0 | 0,1,2,3,4,0... |
| 20 | 2 | {0+2}%5=2 | {2+2}%5=4 | {4+2}%5=1 | {1+2}%5=3 | {3+2}%5=0 | 0,2,4,1,3,0... |
| 30 | 3 | {0+3}%5=3 | {3+3}%5=1 | {1+3}%5=4 | {4+3}%5=2 | {2+3}%5=0 | 0,3,1,4,2,0... |
| 40 | 4 | {0+4}%5=4 | {4+4}%5=3 | {3+4}%5=2 | {2+4}%5=1 | {1+4}%5=0 | 0,4,3,2,1,0... |
| 0 | 5 | {0+5}%5=0 | | | | | |

| Line Offset = Line1x + (0..31) | Line Offset >> 1 (Table lookup index) | Bank (Line Offset) |
|---|---|---|
| 0/1 | 0 | 0 |
| 2/3 | 1 | |
| 4/5 | 2 | |
| 6/7 | 3 | |
| 8/9 | 4 | |
| 10/11 | 5 | 1 |
| 12/13 | 6 | |
| 14/15 | 7 | |
| ... | ... | |
| 20/21 | 10 | 2 |
| ... | ... | ... |
| 48/49 | 24 | 4 |
| 50/51 | 25 | 0 (wraps around) |
| ... | ... | ... |
| 78/79 | 39 | 2 |
| 80 | 40 | 3 |

FIG. 7

| Rows10x' (EQUATION 4) | 1st EIGHT ELEMENTS (CS = 0) | 2nd EIGHT ELEMENTS (CS = 1) | 3rd EIGHT ELEMENTS (CS = 2) | 4th EIGHT ELEMENTS (CS = 3) | 5th EIGHT ELEMENTS (CS = 4) |
|---|---|---|---|---|---|
| | | | BASELINE BANK (EQUATION 5) | | |
| 0 | 0 | | | | |
| 1 | 0 | 1 | 2 | 3 | 4 |
| 2 | 0 | 1 | 2 | 3 | 4 |
| 3 | 0 | 2 | 4 | 1 | 3 |
| 4 | 0 | 3 | 1 | 4 | 2 |
| | 0 | 4 | 3 | 2 | 1 |

| Baseline Bank – from Table 800 (FIG. 8) | Bank – from Table 700 (FIG. 7) | | | | |
|---|---|---|---|---|---|
| | 0 | 1 | 2 | 3 | 4 |
| 0 | 0 | 1 | 2 | 3 | 4 |
| 1 | 1 | 2 | 3 | 4 | 0 |
| 2 | 2 | 3 | 4 | 0 | 1 |
| 3 | 3 | 4 | 0 | 1 | 2 |
| 4 | 4 | 0 | 1 | 2 | 3 |

| Actual Col | ColSet (CS) | Col40x | [Col1x/8] | x10 | x20 | x30 | x40 | Rows10x' | | | | | | | |
|---|---|---|---|---|---|---|---|---|---|---|---|---|---|---|---|
| | | | | | | | | 1 x10/50 | 2 x20/50 | 3 x30/50 | 4 x40/50 | 1 x10% | 2 x20% | 3 x30% | 4 x40% |
| 0.7 | 0 | 0 | 0 | 0 | 0 | 0 | 0 | 0 | 0 | 0 | 0 | 0 | 0 | 0 | 0 |
| 8.15 | 1 | | 1 | 10 | 20 | 30 | 40 | 0 | 0 | 0 | 0 | 10 | 20 | 30 | 40 |
| 16.23 | 2 | | 2 | 20 | 40 | 60 | 80 | 0 | 0 | 1 | 1 | 20 | 40 | 10 | 30 |
| 24.31 | 3 | | 3 | 30 | 60 | 90 | 120 | 0 | 1 | 1 | 2 | 30 | 10 | 40 | 20 |
| 32.39 | 4 | | 4 | 40 | 80 | 120 | 160 | 0 | 1 | 2 | 3 | 40 | 30 | 20 | 10 |

1500

ADDRESSING SCHEME FOR LOCAL MEMORY ORGANIZATION

TECHNICAL FIELD

The present disclosure relates generally to an addressing scheme for local memory organization and, in particular embodiments, to a method of using the addressing scheme to access a memory segment.

BACKGROUND

It is tempting to think of memory in terms of a one-dimensional table. The reality of memory is typically more complicated. Consider a standard 4 megabyte (MB) block of random access memory (RAM). If the structure of the standard 4 MB block of RAM was presented in one dimension, access to a memory location may be seen to need a decoder that can handle approximately four million address lines. Clearly, such a decoder would be complex and, consequently, inefficient.

Some memory addressing schemes handle the complexity of decoding access to a block of memory by organizing the block of memory as a two-dimensional array. For such a two-dimensional array, an address to a particular memory location may be split into two parts: a row address; and a column address. Accordingly, the number of address lines that the decoder has to process is reduced, from approximately four million down to 4096 in this example, with 2048 address lines per row and 2048 address lines per column.

SUMMARY

A memory tile, in a local memory, may be considered to be a unit of memory that carries multiple memory elements, wherein each memory element is a one-dimensional memory structure. Multiple memory tiles make up a memory segment.

Subsequent to the establishment of an addressing scheme for memory elements carried by the memory tiles in a given memory segment, it may be shown that non-blocking, concurrent write and read accesses to the memory elements may be achieved, for multiple requestors, with relatively high throughput. Indeed, matrix elements in a data matrix may be mapped to the memory elements within the given memory segment in accordance with the addressing scheme. The accesses may be either row-major or column-major when the data matrix is two-dimensional.

According to an aspect of the present disclosure, there is provided a method of memory access. The method includes establishing an addressing scheme for a memory segment, the addressing scheme defining a plurality of memory tiles, each memory tile among the plurality of memory tiles designated as belonging to a memory bank among a plurality of memory banks and a memory sub-bank among a plurality of memory sub-banks. The addressing scheme further defining a plurality of memory entries, each memory entry among the plurality of memory entries extending across the plurality of memory tiles, each memory tile among the plurality of memory tiles having plurality of memory lines associated with each memory entry among the plurality of memory entries and each memory line among the plurality of memory lines having a plurality of memory elements, wherein each memory element is a one-dimensional memory structure. The method further includes selecting, using the addressing scheme, a memory element among the plurality of memory elements in a first memory line among the plurality of memory lines in a first entry of a first memory tile in a first memory bank and a first memory sub-bank, thereby establishing a first selected memory element and selecting, using the addressing scheme, a memory element among the plurality of memory elements in a second memory line among the plurality of memory lines in a first entry of a second memory tile in a second memory bank, thereby establishing a second selected memory element. The method further including, in a single clock cycle, accessing the first selected memory element as a first memory element for storing a first matrix element among a plurality of matrix elements, a quantity of matrix elements in the plurality of matrix elements being equivalent to a quantity of memory elements in the plurality of memory elements each memory line and accessing the second selected memory element as a second memory element for storing a second matrix element among a second plurality of matrix elements. Additionally, aspects of the present application provide an address translation circuit for carrying out this method and a computer-readable medium storing instructions that, when executed, cause a processor to carry out this method.

According to an aspect of the present disclosure, there is provided a method of handling memory accesses. The method includes, within a single cycle, receiving a row-major memory access command, satisfying the row-major memory access command, receiving a column-major memory access command and satisfying the column-major memory access command.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 3 illustrates a table of example mappings of matrix elements of various matrices to memory locations, according to aspects of the present disclosure;

FIG. 7 illustrates an example LineOffset-to-Bank lookup table, according to aspects of the present disclosure;

FIG. 8 illustrates an example Baseline Bank Hardware Lookup table, according to aspects of the present disclosure;

FIG. 9 illustrates an example Final Bank Lookup table, according to aspects of the present disclosure;

FIG. 15 illustrates a Div 50/Mod 50 lookup table, according to aspects of the present application;

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
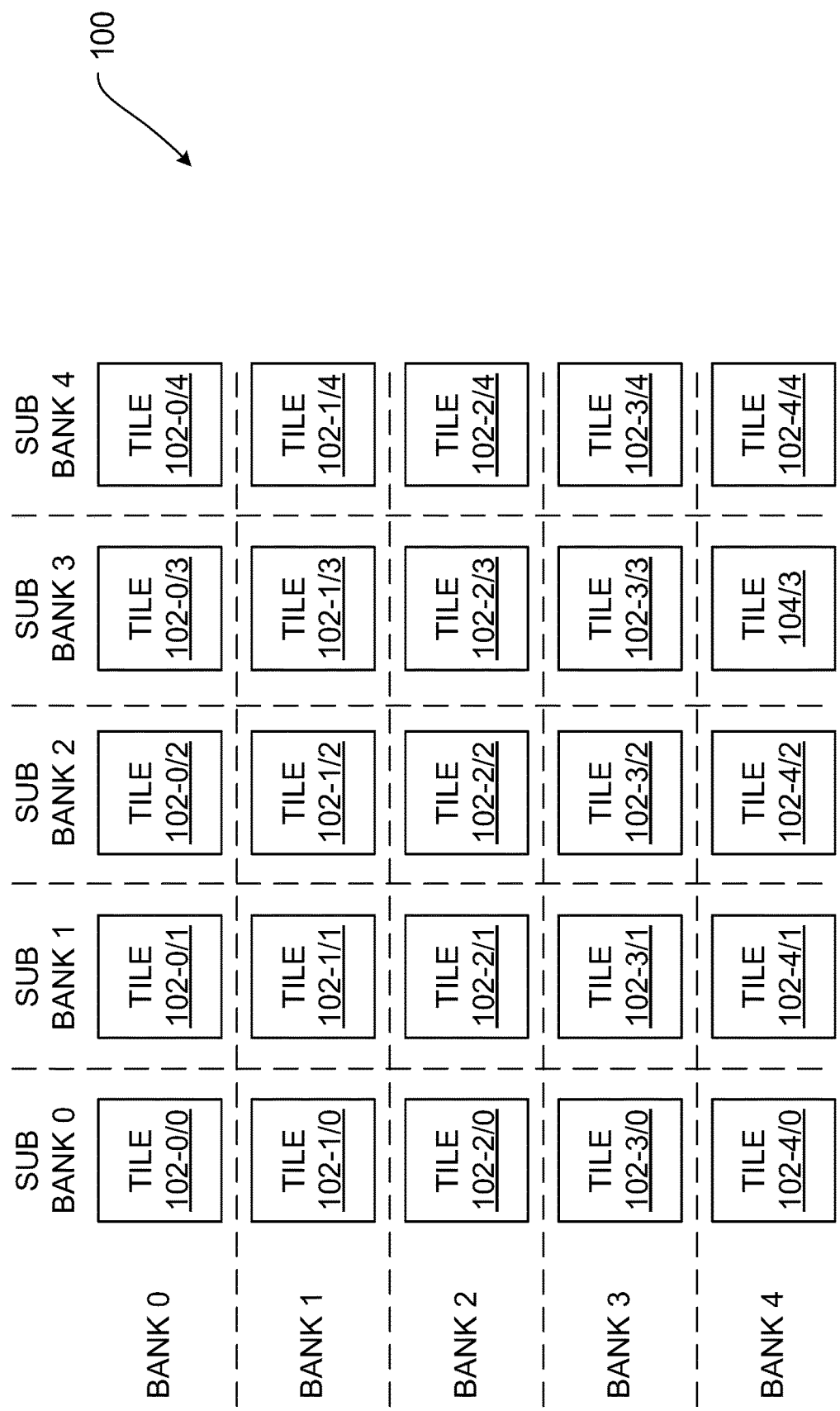
FIG. 1 is a schematic diagram of a memory segment, according to aspects of the present disclosure.

A memory segment arranged in accordance with aspects of the present application may be said to be a two-dimensional memory array of B×SB memory tiles, where "B" is the number of rows of memory tiles, with each row referred to as a "bank," and where "SB" is the number of columns of memory tiles, with each column referred to as a "sub-bank." A memory segment 100 is illustrated in FIG. 1 with a configuration of B=SB=5.

A bank "0" in the memory segment 100 includes memory tiles 102-0/0, 102-0/1, 102-0/2, 102-0/3, 102-0/4. A bank "1" includes memory tiles 102-1/0, 102-1/1, 102-1/2, 102-1/3, 102-1/4. A bank "2" includes memory tiles 102-2/0, 102-2/1, 102-2/2, 102-2/3, 102-2/4. A bank "3" includes memory tiles 102-3/0, 102-3/1, 102-3/2, 102-3/3, 102-3/4. A bank "4" includes memory tiles 102-4/0, 102-4/1, 102-4/2, 102-4/3, 102-4/4. The memory tiles may collectively or individually be referenced with numeral 102.

Each memory tile 102 may be implemented as a known and readily commercially available static random access memory (SRAM) macro.

The memory tiles 102 are organized collections of memory "elements." The memory elements are considered to be collected in memory "lines." In general, each memory tile 102 can have a dimension defined as L×C×W, where "L" is a number of memory lines across a so-called width of the memory tile 102, "C" is the number of memory elements per memory line and "W" is a count of the capacity, in bits, of each memory element. In one example, L=2, which means that there are two memory lines across the memory tile 102. These two memory lines may be distinguished by referencing them as an even memory line and an odd memory line. Also in this example, C=8 means that each memory line includes eight memory elements. Furthermore, in this example, W=16, which means that each memory element stores 16 bits (two bytes) of data.

SRAM macros and, accordingly, the memory segment 100 are known organized in entries. It may be considered that the entire structure of memory tiles 102 illustrated in FIG. 1 is just one of a plurality of memory entries.

The total size (in bytes) of an entry in the memory tile 102, in this example, may be determined by multiplying the number of memory lines (two) by the number of memory elements per memory line (eight) by the number of bytes per memory element (two). Accordingly, in this example, each entry of each memory tile 102 may be said to have 32 bytes of addressable memory.

In the context of a first entry, a single bank of memory tiles 102 in the example memory segment 100 presented in FIG. 1, with five sub-banks of memory tiles 102 and two memory lines per memory tile 102, may be viewed as a collection of SB×L=5×2=10 memory lines. It follows that the single bank of memory tiles 102 in the example memory segment 100, with eight memory elements per memory line and ten memory lines, can also be viewed as a collection of 8×10=80 memory elements.

Notably, all five parameters mentioned hereinbefore (B, SB, L, C, W) can have arbitrary values. The selection of these parameters, in particular, directly affects the implementation of a logical-to-physical address translation block (described hereinafter in the context of FIG. 6). For example, if B=SB=4, a logical-to-physical address translation operation may be understood to be trivial.

The example memory segment 100, presented in FIG. 1, may be employed to store a matrix of data arranged in rows and columns of matrix elements. As part of an operation (i.e., a read operation or a write operation) related to a matrix element defined by a row and a column, an address translation circuit, to be discussed hereinafter, may be employed to use an addressing scheme representative of aspects of the present application to convert an indication of the row and the column of the matrix element to a specific bank and sub-bank for a particular memory tile 102 and a specific memory entry and memory line of the particular memory tile 102.

The addressing scheme representative of aspects of the present application may be shown to allow for efficient performance of the logical-to-physical addresses translation task, even for those cases wherein B and SB are not powers of two.

Hereinafter, for illustration, the above parameters will be used, that is: B=5; SB=5; L=2; C=8; and W=16.

Conveniently, then, the configuration of the memory segment 100 supports an access bandwidth of up to 10 rows of 40 matrix elements (so-called row major access) or 50 rows of eight matrix elements (so-called column major access), per clock cycle. At a 1 GHz clock speed, this is equivalent to 4 Tb/s.

However, there are some restrictions. The 10×40 row-major access is supported by the configuration of the memory segment 100 only when the starting line is even and the starting column modulo-8 is 0. Without such restrictions, a maximum of 8×32 row-major access is supported.

According to the addressing scheme representative of aspects of the present application, a plurality of memory lines are defined for each memory tile 102 for a particular memory entry. In the example discussed herein, the quantity of the plurality is set to two. Since each of the memory lines may be referenced by an index, it may be considered that the memory lines in each memory tile 102 and memory entry has either an even-numbered index or has an odd-numbered index.

Figure 2:
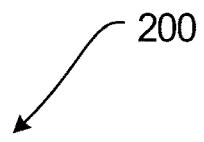
FIG. 2 illustrates a table indices for memory lines in the memory segment of FIG. 1, according to aspects of the present disclosure.

FIG. 2 illustrates a table 200 of indices for the memory lines in the memory segment 100 of FIG. 1. The memory segment 100 may be considered, for one example, to have a capacity to carry 51,200 memory lines (i.e., there are 1,024 memory entries and 50 memory lines per entry across all 5×5 memory tiles 102), where each memory line includes eight two-byte elements (C=8), giving a total capacity for the memory segment 100 of 819,200 bytes, which may be represented as 5×5=25 memory tiles 102, with each memory tile 102 having a capacity of 32,768 bytes. Since each memory entry of each memory tile 102 among the 1,024 memory entries carries two memory lines (L=2), it follows that a single entry of five memory tiles 102 by five memory tiles 102 has a total capacity of 800 bytes.

In FIG. 2, it can be seen that for memory entry 0, the memory lines in the memory tile 102-0/0 in bank 0 and sub-bank 0 have indexes 0 and 1, though only index 0 is referenced in the table 200 of FIG. 2. In the same bank and the same memory entry, the memory tile 102 in the subsequent sub-bank indexes a subsequent two memory lines. That is, within the bank 0, the memory tile 102-0/1 in the next sub-bank (sub-bank 1) the memory lines have the next two indices, namely 2 and 3, though only index 2 is referenced in the table 200 of FIG. 2.

Each memory element is two bytes. It follows that two memory lines, with eight memory elements per memory line and two bytes per memory element means that there are 32 bytes available for access for a given memory entry in a given memory tile 102. Addressing two memory lines together, in the same memory tile 102, reduces, by a factor of two, the number of memory tiles 102 that are expected to be used to store a given amount of data.

For example, a column-major access may be understood to address 50E (memory lines)×1 (memory element) in a single clock cycle.

Addressing two memory lines in a single memory tile 102 for a given memory entry means that it is possible to access 16 memory tiles 102 in a single clock cycle. In contrast, in cases wherein there is only one memory line per memory tile for a given memory entry, addressing the same amount of data means attempting to access 32 memory tiles in a clock cycle.

Notably, there exists a tradeoff here. Addressing two memory lines in a single memory tile 102 means that eight columns may be accessed per line in a single memory tile. Whereas, if only a single line is addressed per single memory tile 102, then 16 columns may be accessed per line. The act of choosing to address eight columns per line (and two lines per tile) is based on planning to access no more than 32 columns in a single clock cycle. However, if there is a plan to access more than 32 columns in a single clock cycle, then this can be facilitated by choosing to address 16 columns per tile.

One particular use case involves a maximum of eight memory lines (up to 32E per memory line) to be accessed in a single clock cycle. This involves a minimum of five sub-banks (horizontally). For example, accessing memory line 1 through memory line 8 requires accessing sub-bank 0 through sub-bank 4.

In FIG. 2, it may be seen that, for a given ten memory lines in a given bank, the next ten memory lines are referenced in the next bank, in the same memory entry. Each subsequent memory entry in the same memory tile 102 references memory line indexes that are 50 memory line indexes away from the memory line indexes in the previous memory entry.

That is to say, memory line index 0 through memory line index 9 are found in bank 0, memory entry 0 and sub-banks 0-4; memory line index 10 through memory line index 19 are found in bank 1, memory entry 0 and sub-banks 0-4; memory line index 20 through memory line index 29 are stored in bank 2, memory entry 0 and sub-banks 0-4; memory line index 30 through memory line index 39 are stored in bank 3, memory entry 0 and sub-banks 0-4; memory line index 40 through memory line index 49 are stored in bank 4, memory entry 0 and sub-banks 0-4; and memory line index 50 through memory line index 59 are stored in bank 0, memory entry 1 and sub-banks 0-4.

The example addressing scheme is configured for referencing the memory segment 100 with five banks vertically and five sub-banks horizontally, for a total of 25 (five times five) memory tiles 102. With two memory lines per memory tile 102, it follows that there are 50 memory lines in the collection of memory tiles 102 associated with a single memory entry.

It can be seen, in the table 200 of FIG. 2, that memory line index 50 through memory line index 59 wrap around such that they are found in bank 0, memory entry 1. As a rule, a new memory entry starts with a memory line having an index that is divisible by 50, which is the number of memory lines in a single memory entry of the memory segment 100 of FIG. 1.

Conveniently, using only 25 memory tiles 102, aspects of the present application can support column-major access to a block of memory that is 32 memory lines×1 memory element. Such an access may be expected to make use of 16 memory tiles 102.

When five banks are used, such as in the memory segment 100 of FIG. 1, it may be shown that there is support for access to a maximum of 50 memory lines in a single clock cycle.

By convention, memory elements within a memory line may be referenced with an index with a "C" as a prefix. When eight 16-bit matrix elements are stored in the eight 16-bit memory elements in the memory line with index 0 in the memory tile 102-0/0 of memory entry 0, the matrix elements may be indexed as C0-7. The subsequent eight 16-bit matrix elements may be stored in eight 16-bit memory elements in a memory in a memory tile 102 in a bank different from bank 0 and may be indexed as C8-15. Similarly, each subsequent set of eight memory elements may be stored in a memory tile 102 in a bank distinct from the other banks.

To access 32 memory elements in a single clock cycle, it is understood that at least four (32 divided by 8) banks of memory tiles 102 in the memory segment 100 would be used.

However, to support the access starting from any starting memory element, it is understood that at least at least five banks of memory tiles 102 in the memory segment 100 would be used. For example, for access related to the 32 consecutive memory elements C5 to C36, the memory elements used might include those memory elements in the banks that include the following memory element indices: C5-7; C8-15; C16-23; C24-31; and C32-36.

In practical operation, the memory segment 100 of FIG. 1, as configured to be accessed with an addressing scheme that implements aspects of the present application as in the example table 200 of FIG. 2, may be used to store matrix elements of a data matrix. For convenience, it is considered that each matrix element of the example data matrix considered herein is the same size (16 bits=two bytes) as the memory elements of the memory segment 100. It is understood that such may not always be the case. Indeed, aspects of the present application allow for enough flexibility to support, say, elements that are 32 bits. In such a case, the number of columns per line per entry will be halved to four instead of eight.

In general, and to facilitate access to multiple matrix elements, either in a row-major fashion or in a column-major fashion, within a single clock cycle, for a given set of memory elements accessed, the next eight memory elements accessed are the set of eight memory elements indexed in a bank that is distinct from the bank of the given set of memory elements. The answer to the question "Which bank is the distinct bank?" may be considered to depend on the number of rows of matrix elements in the data matrix that is accessed in the memory segment 100.

FIG. 3 illustrates a table 300 of example mappings of matrix elements of various matrices to memory locations, as identified by memory entry and by bank. Notably, memory lines of the memory segment 100 are referenced by a number. Accordingly, the even memory line in entry 0 and the memory tile 102-0/0 in the first bank in the first sub-bank is referenced as memory line number 0. It follows that the odd memory line in entry 0 and the memory tile 102-4/4 in the fourth bank in the fourth sub-bank is referenced as memory line number 49. Notably, the even memory line in entry 1 and the memory tile 102-0/0 in the first bank in the first sub-bank is referenced as memory line number 50. The table 300 of example mappings of matrix elements of FIG. 3 relates specifically to a first example matrix 302 and a second example matrix 304.

For example, consider storage of an example data matrix with 172 rows of matrix elements and 64 matrix elements in each row, that is, the example data matrix has 64 columns. The first eight matrix elements (matrix element 0 through matrix element 7) of the first ten rows (matrix row 0 through matrix row 9) of the 172×64 data matrix may be stored in entry 0, bank 0. More particularly, the first eight matrix elements (matrix element 0 through matrix element 7) of the first row (matrix row 0) of the 172×64 data matrix may be stored in entry 0, bank 0, sub-bank 0, in the even line. The first eight matrix elements (matrix element 0 through matrix element 7) of each subsequent row may be stored in subsequent memory lines of memory tiles 102 across bank 0 until the first eight matrix elements (matrix element 0 through matrix element 7) of the tenth row (row 9) of the 172×64 data matrix are stored in entry 0, bank 0, sub-bank 4, odd memory line.

For simplicity, it is assumed for this example that the matrix elements are the same size as the memory elements (i.e., 16 bits), but the two element sizes need not be the same and need not be 16 bits.

In a manner similar to the case of the first ten rows of the 172×64 data matrix, the first eight matrix elements (matrix element 0 through matrix element 7) of the next ten rows (10-19) of the 172×64 data matrix may be stored in the ten memory lines of entry 0, bank 1. After having stored the first eight matrix elements (matrix element 0 through matrix element 7) of rows 40-49 in the ten memory lines of entry 0, bank 4, the first eight matrix elements (matrix element 0 through matrix element 7) of rows 50-59 may be stored in the ten memory lines of entry 1, bank 0. After having stored the first eight matrix elements (matrix element 0 through matrix element 7) of rows 90-99 in the ten memory lines of entry 1, bank 4, the first eight matrix elements (matrix element 0 through matrix element 7) of rows 100-109 may be stored in the ten memory lines of entry 2, bank 0. After having stored the first eight matrix elements (matrix element 0 through matrix element 7) of rows 140-149 in the ten memory lines of entry 2, bank 4, the first eight matrix elements (matrix element 0 through matrix element 7) of rows 150-159 may be stored in the ten memory lines of entry 3, bank 0. After having stored the first eight matrix elements (matrix element 0 through matrix element 7) of rows 170-171 in the first two memory lines of entry 3, bank 2, the next task may be to store the second eight matrix elements (matrix element 8 through matrix element 15) of each of rows 0-171.

The second eight matrix elements (matrix element 8 through matrix element 15) of the first ten rows of the 172×64 data matrix may be stored starting from entry 3, bank 3. The third eight matrix elements (matrix element 16 through matrix element 23) of the first ten rows of the 172×64 data matrix may be stored starting from entry 7, bank 1. The fourth eight matrix elements (matrix element 24 through matrix element 31) of the first ten rows of the 172×64 data matrix may be stored starting from entry 10, bank 4. The fifth eight matrix elements (matrix element 32 through matrix element 39) of the first ten rows of the 172×64 data matrix may be stored starting from entry 14, bank 2. The sixth eight matrix elements (matrix element 40 through matrix element 47) of the first ten rows of the 172×64 data matrix may be stored starting from entry 18, bank 0. The seventh eight matrix elements (matrix element 48 through matrix element 55) of the first ten rows of the 172×64 data matrix may be stored starting from entry 21, bank 3. The eighth eight matrix elements (matrix element 56 through matrix element 63) of the first ten rows of the 172×64 data matrix may be stored starting from entry 25, bank 1.

In another example illustrated in FIG. 3, the table allows for consideration of storage of an example data matrix with 96 rows of matrix elements and 64 matrix elements in each row. The first eight matrix elements (matrix element 0 through matrix element 7) of the first ten rows (row 0 through row 9) of the 96×64 data matrix may be stored in entry 29, bank 0. More particularly, the first eight matrix elements (matrix element 0 through matrix element 7) of the first row (row 0) of the 96×64 data matrix may be stored in entry 29, bank 0, sub-bank 0, in the even memory line. The first eight matrix elements (matrix element 0 through matrix element 7) of each subsequent row may be stored in subsequent memory lines of memory tiles 102 across bank 0 until the first eight matrix elements (matrix element 0 through matrix element 7) of the tenth row (row 9) of the 96×64 data matrix are stored in entry 29, bank 0, sub-bank 4, odd memory line.

The second eight matrix elements (matrix element 8 through matrix element 15) of the first ten rows of the 96×64 data matrix may be stored starting from entry 31, bank 1. The third eight matrix elements (matrix element 16 through matrix element 23) of the first ten rows of the 96×64 data matrix may be stored starting from entry 33, bank 2. The fourth eight matrix elements (matrix element 24 through matrix element 31) of the first ten rows of the 96×64 data matrix may be stored starting from entry 35, bank 3. The fifth eight matrix elements (matrix element 32 through matrix element 39) of the first ten rows of the 96×64 data matrix may be stored starting from entry 37, bank 4. The sixth eight matrix elements (matrix element 40 through matrix element 47) of the first ten rows of the 96×64 data matrix may be stored starting from entry 40, bank 0. The seventh eight matrix elements (matrix element 48 through matrix element 55) of the first ten rows of the 96×64 data matrix may be stored starting from entry 42, bank 1. The eighth eight matrix elements (matrix element 56 through matrix element 63) of the first ten rows of the 96×64 data matrix may be stored starting from entry 44, bank 2.

Under the addressing scheme that is representative of aspects of the present application, any given collection of four sets of eight matrix elements may be mapped to a bank that is distinct from the banks to which the previous four sets of eight elements have been mapped, thereby avoiding bank conflicts during access in a single clock cycle.

The number, five, of banks for the example memory segment 100 of FIG. 1 may be considered to have a preferable cyclic property, wherein a number among the set of numbers including one, two, three and four, when added to itself modulo five repeatedly, will generate all the numbers among the set of numbers including zero, one, two, three and four. After five rounds, the pattern may be observed to repeat.

Aspects of the present application involve rounding up, to the nearest multiple of 10, the number of rows in a data matrix to be stored in the memory segment 100.

Figure 4:
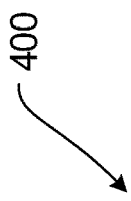
FIG. 4 illustrates an example table to emphasize a special case, according to aspects of the present disclosure.

FIG. 4 illustrates a table 400 that may be considered to assist in a review of the cyclic property of the number five. The table 400 of FIG. 4 shows patterns for five distinct cases, wherein the rounded number of rows in a data matrix to be stored in the memory segment 100, when subject to a modulo 50 operation is either 0, 10, 20, 30 or 40.

The previously discussed example data matrix has 172 rows. This number of rows may be rounded up to 180 according to aspects of the present application. The rounded number of rows for the example data matrix is 180 (row 0 to row 179). The result of subjecting the rounded number of rows to a modulo 50 operation is 30. According to the third line of the table 400 of FIG. 4, there is a "bank jumping distance" of three between adjacent sets of eight memory elements.

Since the bank jumping distance is three when the matrix row count is 172, access to the sets of eight matrix elements may be expected to occur in banks 0, 3, 1, 4, 2, 0, 3 and 1, as illustrated the right-most column of the table 400 in FIG. 4. Notably, this is consistent with the example presented in view of the table 300 illustrated in FIG. 3. It follows that there can be confidence that accessing 32 consecutive matrix elements in a single clock cycle will not result in memory bank conflicts.

As may be seen in the table 400 in FIG. 4, a special case occurs when the rounded number of matrix rows, when subjected to a modulo 50 operation, gives a zero. If using aspects of the addressing scheme discussed hereinbefore in this special case, any set of eight elements can be shown to be destined for the same bank as the previous set of eight elements, thereby resulting in a bank conflict.

To solve the special case, when the rounded matrix row count is divisible by 50, a value of 10 may be added to the rounded matrix row count. This value of 10 is chosen to minimize the wastage of memory.

For example, when a data matrix of interest has a matrix row count of 96, the matrix row count is rounded up to a rounded matrix row count of 100. It may then be recognized that this rounded matrix row count is an instance of the special case (since 100 mod 50=100% 50=0). Responsive to such recognition, a value of 10 may be added to the rounded matrix row count thereby giving a special case rounded matrix row count of 110. The special case rounded matrix row count of 110 may then be used in conjunction with the table 400 of FIG. 4 to determine a bank jumping distance. From table 400, the bank jumping distance may be found to be one when the matrix row count is 96.

Conveniently, then, the configuration of the memory segment 100 supports an access bandwidth of up to eight rows of 32 matrix elements (so-called row major access) or 32 rows of eight matrix elements (so-called column major access), per clock cycle. At a 1 GHz clock speed, this is equivalent to 4 Tb/s.

Figure 5:
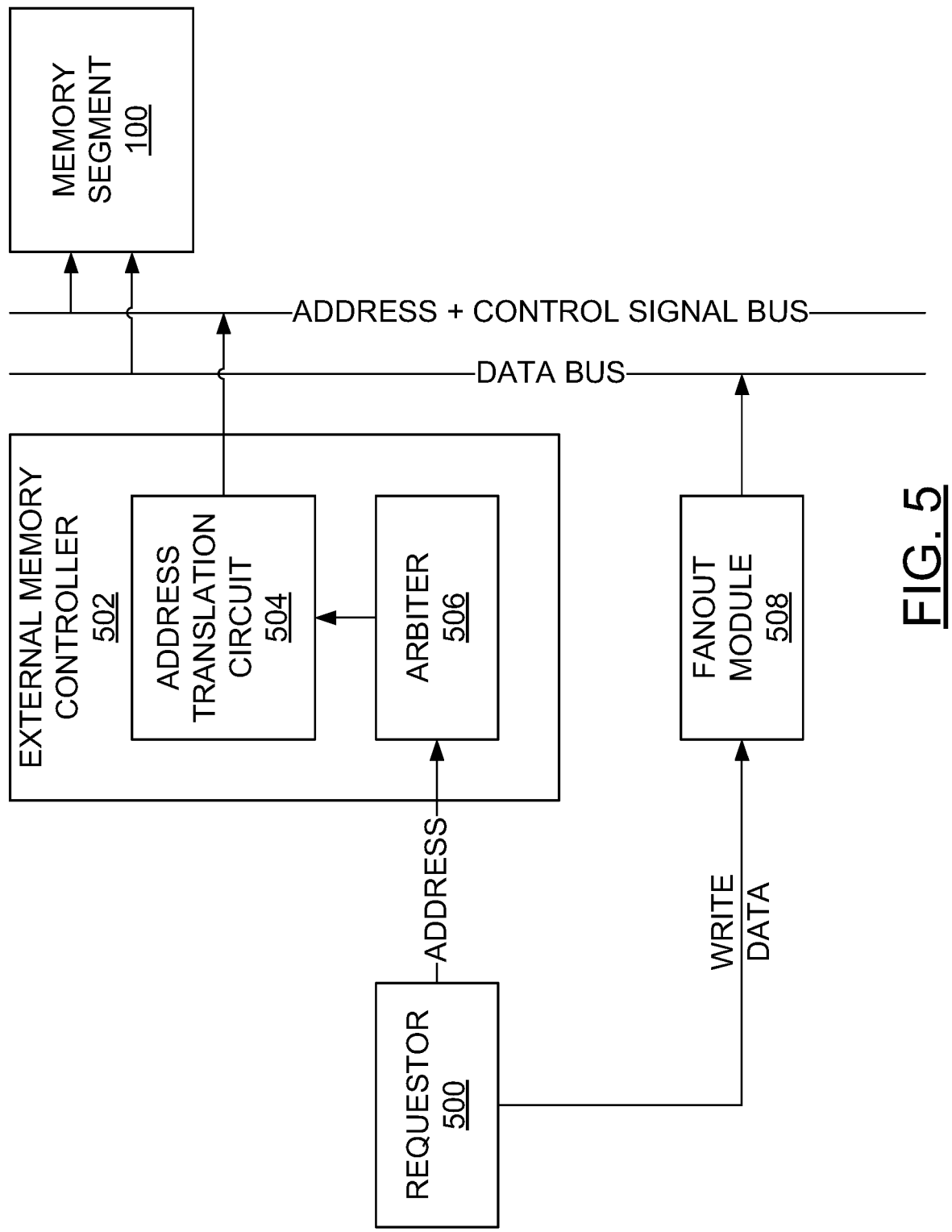
FIG. 5 illustrates an external controller and an address translation circuit, in the context of a write operation according to aspects of the present disclosure.

FIG. 5 illustrates a circuit that provides context for the memory segment 100 of FIG. 1. A plurality of circuit elements known as requestors are expected to be present in the circuit, though only a single requestor 500 is illustrated. In operation, various requestors access the memory segment 100 for a read operation or a write operation.

For every request for access, received from the requestor 500, an external memory controller 502 determines a particular clock cycle during which to grant the requestor 500 access to the memory segment 100 and provides, to the memory segment 100, an address representative of the location of the beginning of a portion of the memory segment 100, which location the requester 500 is to access. More particularly, the external controller 502 includes an arbiter 506 for determining when to grant the requestor 500 access to the memory segment 100 in view of many requests received from many requestors (only one of which is illustrated). The request may be assumed to include a logical request address. The logical request address being an indication of a first matrix element among many matrix elements for which access is requested. The external controller 502 includes an address translation circuit 504 that, in operation, receives the logical request address as input and generates, as output, a physical address in the memory segment 100.

The logical request address includes a plurality of parameters that specify a first matrix element among those matrix elements, in a particular data matrix, for which access is requested.

The parameters of the logical request may include: an indication of the number of rows in the particular data matrix; an indication of the index of the first line in the memory segment 100 where the first matrix elements have previously been stored (when the access is for a read) or the first memory line in the memory segment where the first memory element is to be stored; an indication of the index of the row of the particular data matrix where the first matrix element is found; and an indication of the index of the column of the particular data matrix where the first matrix element is found.

Although there are only four parameters, the requestor 500 is expected to assist the address translation circuit 504 by presenting the parameters in a particular format of sub-parameters. For the indication of the number of rows in the particular data matrix, the sub-parameters are Rows50x, Rows10x and Rows1x. The sub-parameter Rows50x indicates the whole number of times 50 goes into the number of rows, leaving a first remainder. The sub-parameter Rows10x indicates the whole number of times 10 goes into the first remainder, leaving a second remainder. The sub-parameter Rows1x indicates the second remainder. For the example data matrix with 172 rows, the requestor 500 may indicate Rows50x=3, Rows10x=2 and Rows1x=2.

When providing the indication of the index of the first line in the memory segment 100, the requestor 500 may use a sub-parameter Start50x. The sub-parameter Start50x indicates the whole number of times 50 goes into the index of the first line in the memory segment.

When providing the indication of the index of the row of the particular data matrix where the first matrix element is found, the requestor 500 may use sub-parameters Line50x and Line1x. The sub-parameter Line50x indicates the whole number of times 50 goes into the index of the row, leaving a remainder. The sub-parameter Line1x indicates the remainder.

When providing the indication of the index of the column of the particular data matrix where the first matrix element is found, the requestor 500 may use sub-parameters Col40x and Col1x. The sub-parameter Col40x indicates the whole number of times 40 goes into the index of the column, leaving a remainder. The sub-parameter Col1x indicates the remainder.

The address translation circuit 504 then translates the sub-parameters Rows50x, Rows10x, Rows1x=2, Start50x, Line50x, Line1x, Col40x and Col1x into an indication of a physical memory address in the memory segment 100. The indication of the physical memory address in the memory segment 100 includes a reference to a particular memory tile 102 by bank and a sub-bank as well as an entry on the particular memory tile 102. In some trivial cases, the indication of the physical memory address may include an indication of the odd line or the even line.

The address translation circuit 504 may indicate the physical address to the memory segment 100 via an address and control signal bus. Additionally, for a write operation, the requestor 500 provides matrix elements to a fanout module 508. The fanout module 508 provides the matrix elements to the memory segment 100 via a data bus.

Figure 6:
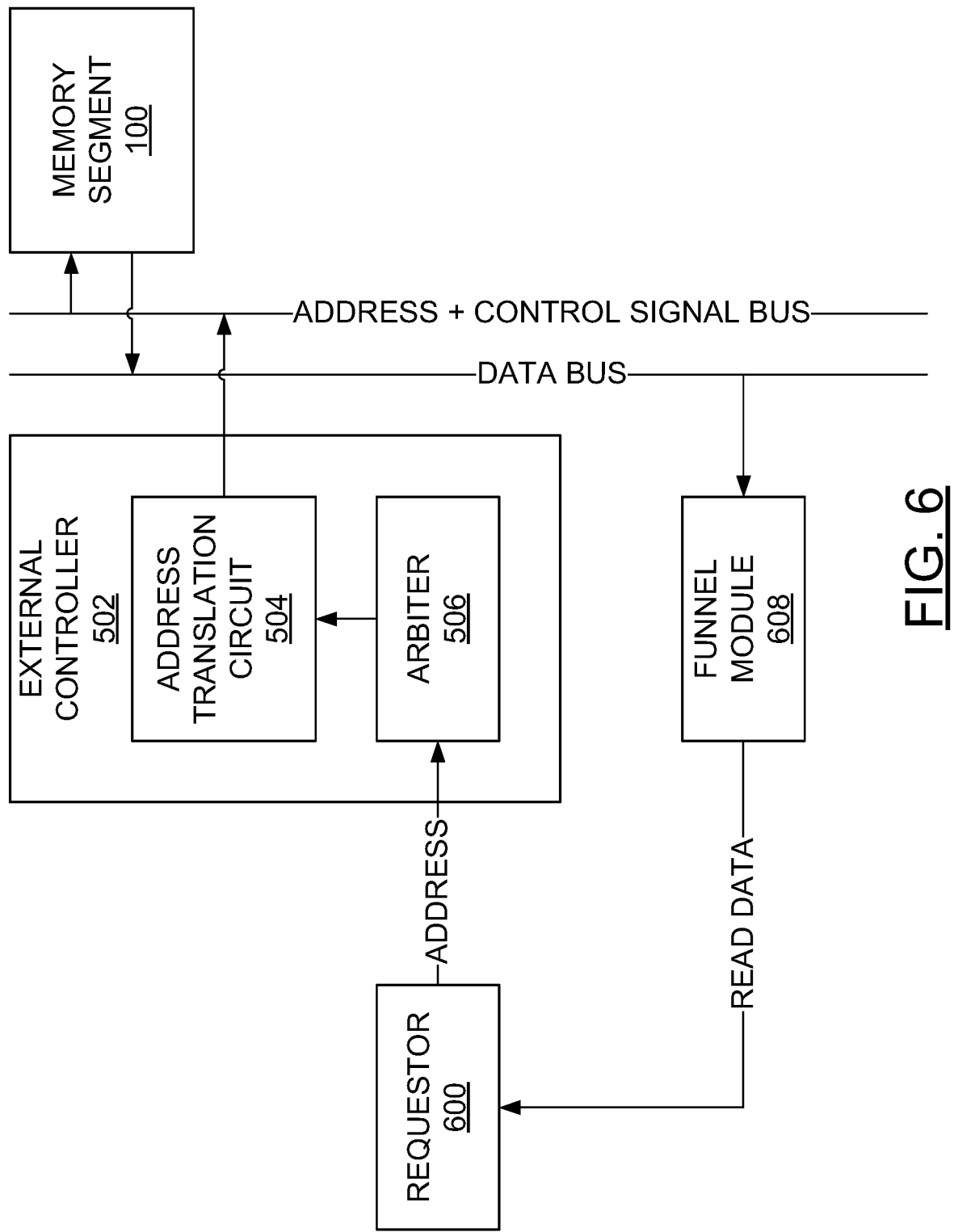
FIG. 6 illustrates an external controller and an address translation circuit, in the context of a read operation according to aspects of the present disclosure.

FIG. 6 illustrates the external controller 502 in the context of a read operation. A distinct requestor 600 is involved in the read operation. The requestor 600 provides, to the arbiter 506 of the external controller 502, the sub-parameters Rows50x, Rows10x, Rows1x=2, Start50x, Line50x, Line1x, Col40x and Col1x for the read operation.

The address translation circuit 504 then translates the sub-parameters Rows50x, Rows10x, Rows1x, Start50x, Line50x, Line1x, Col40x and Col1x into an indication of a physical memory address in the memory segment 100. The indication of the physical memory address in the memory segment 100 includes a reference to a particular memory tile 102 by bank and a sub-bank as well as an entry on the particular memory tile 102. In some trivial cases, the indication of the physical memory address may include an indication of the odd line or the even line.

The address translation circuit 504 may indicate the physical address to the memory segment 100 via an address and control signal bus. Additionally, for the read operation, the memory segment 100 provides requested matrix elements to a funnel module 608 via a data bus. The funnel module 608 provides the matrix elements, that have been read from the memory segment 100, to the requestor 600.

The sub-parameters and the address translation circuit 504 are specific to the values selected for B, SB, L, C and W. The address translation circuit 504 discussed hereinafter is designed for the values B=5, SB=5, L=2, C=8 and W=16. The address translation circuit 504 can be generalized to other values. Aspects of the present application aim to optimize for non-powers-of-two values of B and SB, which optimization may be considered to be more difficult than optimization when the values of B and SB are powers-of-two.

As discussed hereinbefore, the output of the address translation circuit 504 includes a reference to a particular memory tile 102 by bank and a sub-bank as well as an entry on the particular memory tile 102. As such, according to aspects of the present application, the address translation circuit 504 generates an indication of a bank, a sub-bank and an entry for every set of eight matrix elements that are to be accessed, either for a read operation or for a write operation.

The address translation circuit 504 may embody circuitry designed to implement various equations that are involved in translating the sub-parameters Rows50x, Rows10x, Rows1x, Start50x, Line50x, Line1x, Col40x and Col1x into the components (banks, sub-bank and entry) of the physical memory address in the memory segment 100.

Generating an indication of the bank component of the physical address for the first matrix element on a particular row ("First Row") in a particular column ("First Col") may start with Equation (1), as follows:

$$\text{Bank(First Line,First Col)} = [\text{Bank(Line1}x) + \text{Baseline Bank(\# Matrix Rows,First Col)}] \bmod 5 \quad (1)$$

where $$\text{Bank(Line1}x) = \text{FLOOR}(\text{Line1}x/10) \bmod 5 \quad (2)$$

FIG. 7 illustrates a LineOffset-to-Bank lookup table 700 that uses various assumptions. The assumptions include that the memory segment 100 has a capacity of 51,200 memory lines, with eight elements (C=8) per memory line. Accordingly, the maximum dimension of a matrix to be accessed is 2048 rows by 2048 columns. The first column of the table 700 of FIG. 7 shows an actual memory line offset, relative to Line1x. For example, if Line1x is 49 and an operation is to access 32 lines, then the last line offset is 49+31=80. The table 700 of FIG. 7 can be used for simultaneous lookups for rows of multiple matrix elements, not just the row of first matrix element. Notably, the LineOffset-to-Bank lookup table 700 of FIG. 7 is small enough that it may be hard-wired.

The LineOffset-to-Bank lookup table 700 of FIG. 7 may be considered to answer the question, "Given that a particular set of elements of the data matrix is on a particular row (LineOffset or "Line1x") left as a remainder when the number of rows in the data matrix is divided by 50, what should be the bank for storage of the particular set of elements of the data matrix?" That is, the LineOffset-to-Bank lookup table 700 of FIG. 7 may be considered to assist in the implementation of Equation (2).

FIG. 8 illustrates an example Baseline Bank Hardware Lookup table 800 that uses the following equations:

$$\text{Column Set (CS)} = \text{Col1}x \gg 3 \tag{3}$$

$$\text{Rows10}x' = (\text{Rows1}x\, != 0)\, ?\, ((\text{Rows10}x == 4)\, ?\, 1 : \text{Rows10}x+1) : \text{Rows10}x \tag{4}$$

$$\text{BaseLine Bank}(\#\text{ Matrix Rows,First Col}) = \text{BaseLine Bank LKUP}[\text{Rows10}x][\text{CS}] \tag{5}$$

Notably, the Baseline Bank Hardware Lookup table 800 of FIG. 8 is small enough that it may be hard-wired.

The columns of the Baseline Bank Hardware Lookup table 800 of FIG. 8 reference column sets as the $1^{st}$ eight elements, the $2^{nd}$ eight elements, the $3^{rd}$ eight elements, the $4^{th}$ eight elements and the $5^{th}$ eight elements, which are as follows:

Column set 0 ("CS0") includes the $1^{st}$ eight elements, which are the matrix elements (0-7, 40-47, 80-47, etc.).

Column set 1 ("CS1") includes the $2^{nd}$ eight elements, which are the matrix elements (8-15, 48-55, 88-95, etc.).

Column set 2 ("CS2") includes the $3^{rd}$ eight elements, which are the matrix elements (16-23, 56-63, 96-103, etc.).

Column set 3 ("CS3") includes the 4th eight elements, which are the matrix elements (24-31, 64-71, 104-111, etc.).

Column set 4 ("CS4") includes the 5th eight elements, which are the matrix elements (32-39, 72-79, 112-119, etc.).

The Baseline Bank Hardware Lookup table 800 of FIG. 8 may be considered to answer the question, "Given that the data matrix has a particular number of rows, what should the baseline bank be for storage of a particular set of elements of the data matrix?"

FIG. 9 illustrates an example Final Bank Lookup table 900 that may be considered to assist in the implementation of Equation (1) on the basis of results of performing lookup operations in the LineOffset-to-Bank lookup table 700 of FIG. 7, which may be used to implement Equation (2), and the Baseline Bank Hardware Lookup table 800 of FIG. 8, which may be used to implement Equation (5). Notably, the Final Bank Lookup table 900 of FIG. 9 is small enough that it may be hard-wired.

For simultaneous accesses to matrix elements of multiple matrix rows subsequent to the first matrix row accessed, either for row-major access or for column-major access, adjustments to Equations (2) and (3) may be made.

For Equation (2), instead of "Line1x", the address translation circuit 504 is to use "Line X", where "Line X" is "Line1x"+1, +2, . . . up to +31 (e.g., to support up to 32 rows of simultaneous access). A short form of "Line X" is "LX" where the "X" stands in for the value that has been added to Line1x. That is, Line 1=Line1x+1 and may be represented as "L1." 32 equations support column-major access as follows:

$$\text{Bank}(L0/\text{CS0}) = [\text{Bank}(\text{Line1}x=L0)+\text{Baseline Bank}(\text{CS0})]\bmod 5$$

$$\text{Bank}(L1/\text{CS0}) = [\text{Bank}(L1)+\text{Baseline Bank}(\text{CS0})]\bmod 5$$

$$\text{Bank}(L2/\text{CS0}) = [\text{Bank}(L2)+\text{Baseline Bank}(\text{CS0})]\bmod 5$$

$$\text{Bank}(L3/\text{CS0}) = [\text{Bank}(L3)+\text{Baseline Bank}(\text{CS0})]\bmod 5$$

. . .

$$\text{Bank}(L31/\text{CS0}) = [\text{Bank}(L31)+\text{Baseline Bank}(\text{CS0})]\bmod 5$$

Instead of using Col1x in Equation (3), as is done to determine CS0, the address translation circuit 504 uses Col1x+Y to determine CS1, CS2, CS3 and CS4. In particular, Y=8 for CS1, Y=16 for CS2, Y=24 for CS3 and Y=32 for CS4. In this way, simultaneous access to up to 32 matrix elements is supported, in four groups of eight or three groups of eight and two groups of less than eight. The address translation circuit 504 is to assist in the implementation of Equation (7), as follows, so that the baseline bank lookup table 900 can handle wrapping cases where Col1x+Y≥40:

$$\text{CS-}Y/8 = (\text{Col1}x+Y)\gg 3 \tag{6}$$

$$\text{CS-}Y/8\text{Wrapped} = (\text{CS-}Y/8) > 4\, ?\, (\text{CS-}Y/8-5) : \text{CS-}Y/8 \tag{7}$$

$$\text{BaseLine Bank}(\#\text{ Matrix Rows,CS-}Y/8) = \text{BaseLine Bank LKUP}[\text{Rows10}x'][\text{CS Wrapped}] \tag{8}$$

40 equations may be used to support row-major access:

$$\text{Bank}(L0/\text{CS0}) = [\text{Bank}(L0)+\text{Baseline Bank}(\text{CS0})]\bmod 5$$

$$\text{Bank}(L0/\text{CS1}) = [\text{Bank}(L0)+\text{Baseline Bank}(\text{CS1})]\bmod 5$$

$$\text{Bank}(L0/\text{CS2}) = [\text{Bank}(L0)+\text{Baseline Bank}(\text{CS2})]\bmod 5$$

$$\text{Bank}(L0/\text{CS3}) = [\text{Bank}(L0)+\text{Baseline Bank}(\text{CS3})]\bmod 5$$

$$\text{Bank}(L0/\text{CS4}) = [\text{Bank}(L0)+\text{Baseline Bank}(\text{CS4})]\bmod 5$$

. . .

$$\text{Bank}(L7/\text{CS0}) = [\text{Bank}(L7)+\text{Baseline Bank}(\text{CS0})]\bmod 5$$

$$\text{Bank}(L7/\text{CS1}) = [\text{Bank}(L7)+\text{Baseline Bank}(\text{CS1})]\bmod 5$$

$$\text{Bank}(L7/\text{CS2}) = [\text{Bank}(L7)+\text{Baseline Bank}(\text{CS2})]\bmod 5$$

$$\text{Bank}(L7/\text{CS3}) = [\text{Bank}(L7)+\text{Baseline Bank}(\text{CS3})]\bmod 5$$

$$\text{Bank}(L7/\text{CS4}) = [\text{Bank}(L7)+\text{Baseline Bank}(\text{CS4})]\bmod 5$$

Figure 10:
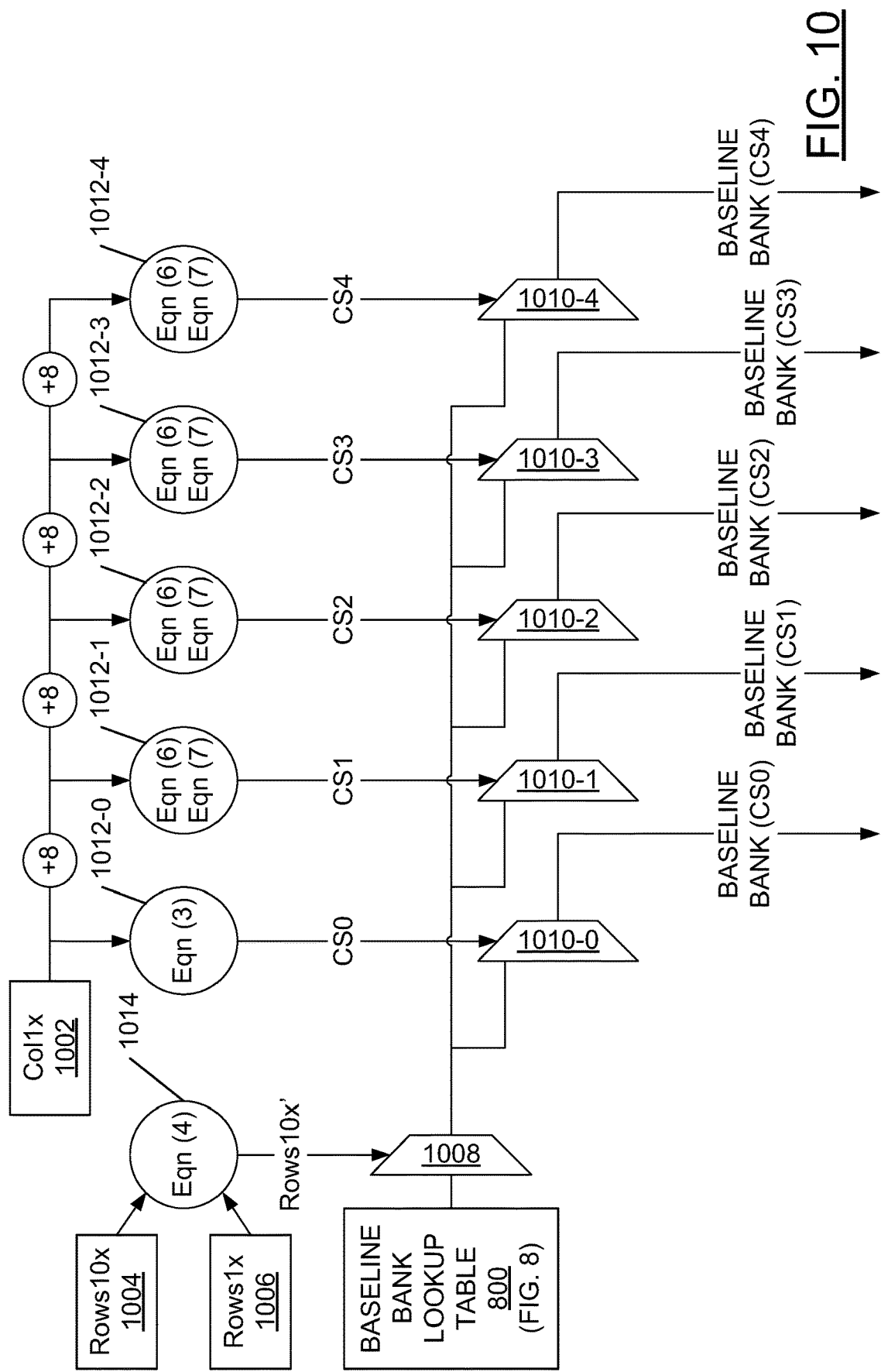
FIG. 10 illustrates a first part of an example bank address generation circuit, according to aspects of the present disclosure.
Figure 11:
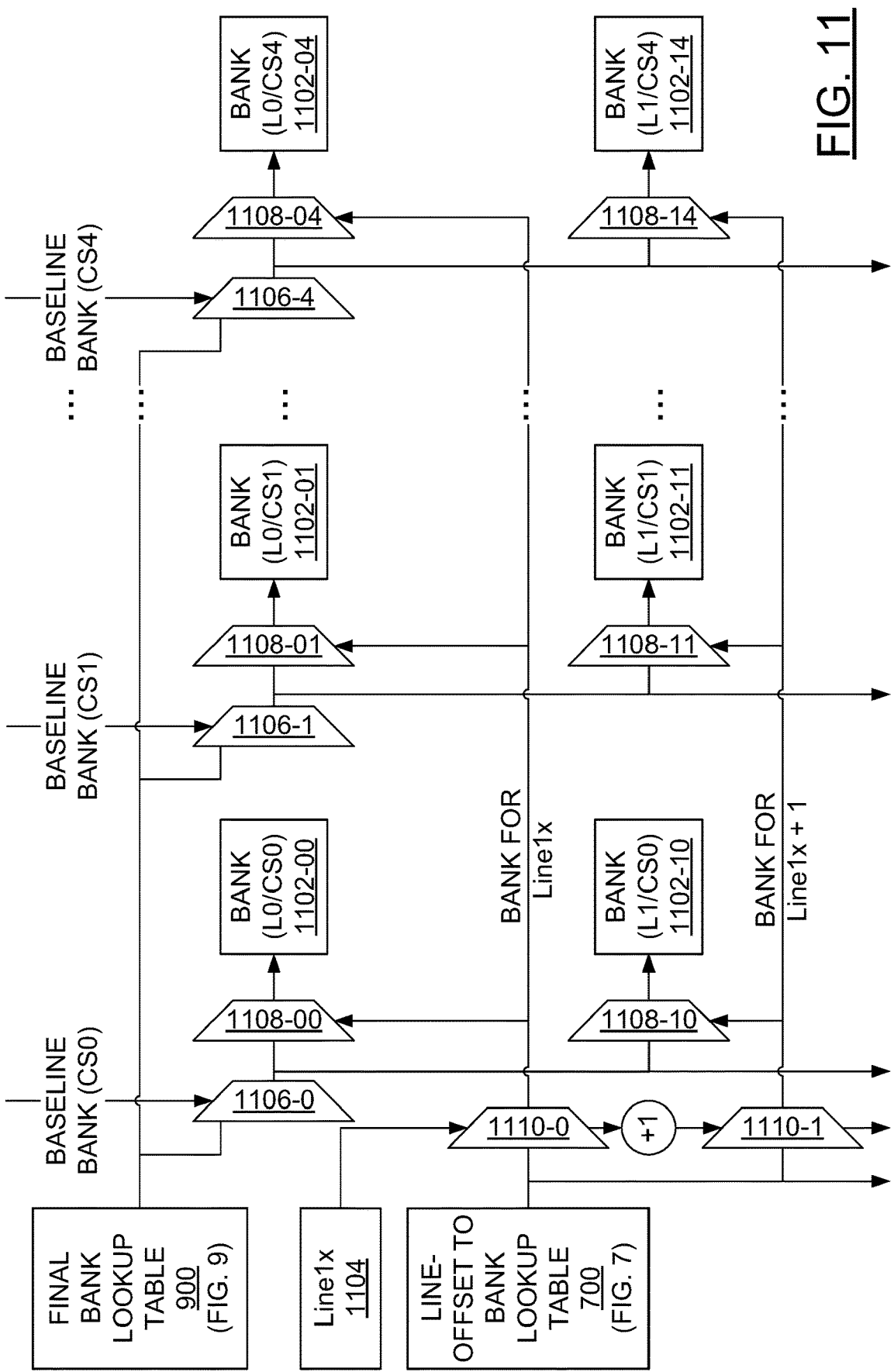
FIG. 11 illustrates a second part of the example bank address generation circuit, according to aspects of the present disclosure.
Figure 12:
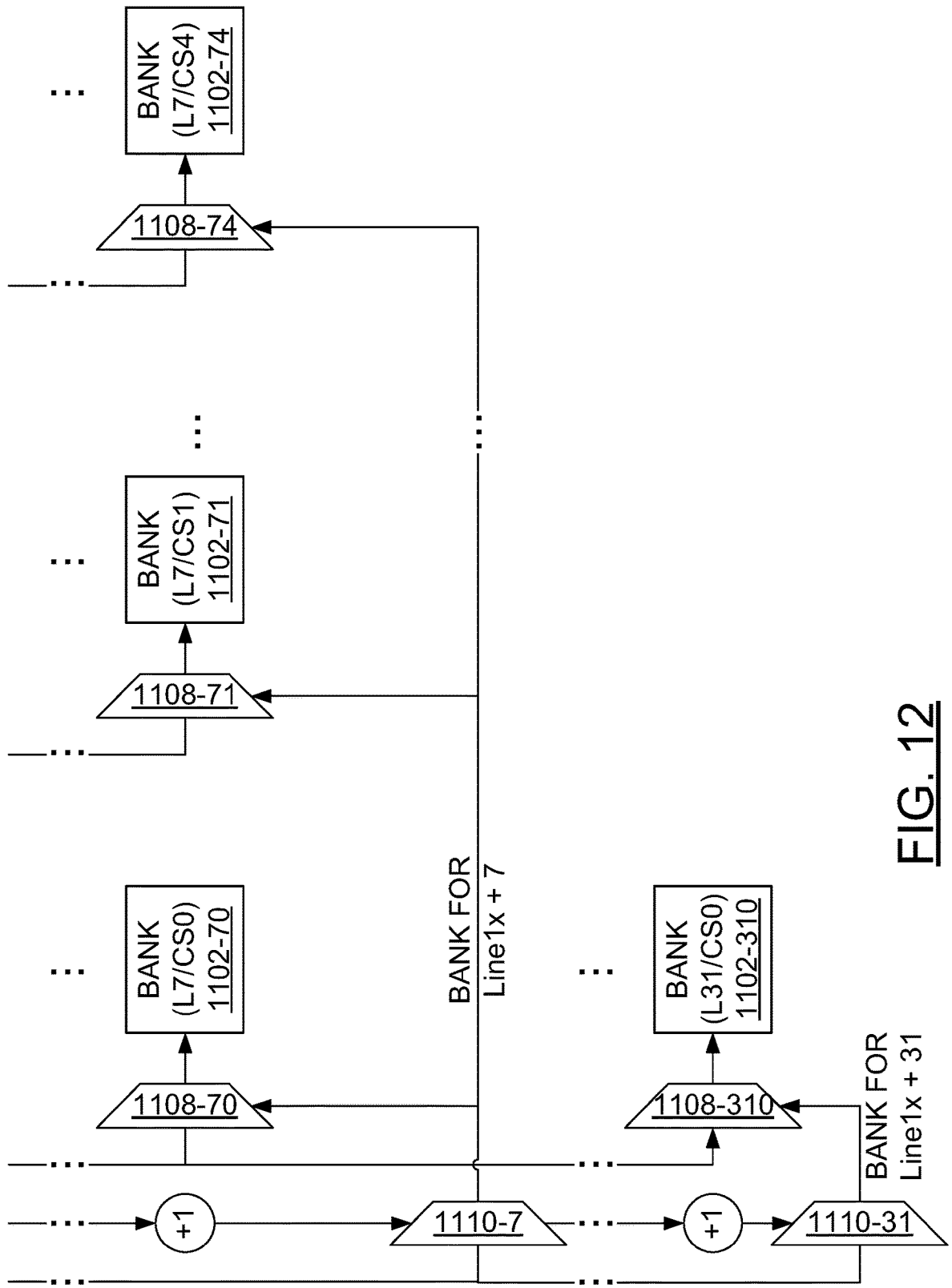
FIG. 12 illustrates a third part of the example bank address generation circuit, according to aspects of the present disclosure.

FIG. 10 illustrates a first part of an example bank address generation circuit that, along with further parts of the same example bank address generation circuit, which parts are illustrated in FIG. 11 and FIG. 12, may be considered to summarize a hardware implementation of Bank Address Generation Logic as part of the address translation circuit 504 according to aspects of the present application. The example Bank Address Generation circuit of FIGS. 10, 11 and 12 supports up to 8×32E (row-major access) and 32×8E (column-major access). The bank portion "Bank(Line X, CS−Y/8)" of an address of may be determined in the Bank Address Generation circuit of FIGS. 10, 11 and 12 as separate logic, but all of the implementations can share the same hardware look-up tables (the LineOffset-to-Bank lookup table 700 in FIG. 7, the Baseline Bank Hardware Lookup table 800 in FIG. 8 and the baseline bank lookup table 900 in FIG. 9) through the use of multiple wire fan-outs, which are not specifically shown.

In FIG. 10, the Bank Address Generation circuit includes a Col1x flip-flop 1002, a Rows10x flip-flop 1004 and a Rows1x flip-flop 1006. The three flip-flops 1002, 1004 and 1006 are representative of request address inputs from the arbiter 506 (see FIG. 6).

A value output from the Col1x flip-flop 1002 is received by logic 1012-0 implementing Equation (3) to, thereby, generate a value for CS0. A value that is Y=8 greater than the value output from the Col1x flip-flop 1002 is received by logic 1012-1 implementing Equations (6) and (7) to, thereby, generate a value for CS1. A value that is Y=16 greater than the value output from the Col1x flip-flop 1002 is received by logic 1012-2 implementing Equations (6) and (7) to, thereby, generate a value for CS2. A value that is Y=24 greater than the value output from the Col1x flip-flop 1002 is received by logic 1012-3 implementing Equations (6) and (7) to, thereby, generate a value for CS3. A value that is Y=32 greater than the value output from the Col1x flip-flop 1002 is received by logic 1012-4 implementing Equations (6) and (7) to, thereby, generate a value for CS4.

A logic operator 1014 implementing Equation (4) receives a value from the Rows10x flip-flop 1004 and a value from the Rows1x flip-flop 1006 and generates a value for Rows10x'. The value for Rows10x' is used by a Baseline Bank Lookup Table Row Multiplexer 1008 in combination with each one of five Baseline Bank Lookup Table Column Multiplexers 1010-0, 1010-1, 1010-2, 1010-3, 1010-4 to produce, as output from each Baseline Bank Lookup Table Column Multiplexer 1010, an indication of a Baseline Bank to associate with each CS.

It may be considered that the first part of the example bank address generation circuit that is illustrated in FIG. 10 operates to implement Equation (5).

In FIG. 11, a final bank row multiplexer (MUX) 1106-0 receives, from the circuit part of FIG. 10, an indication of a baseline bank value for CS0. The final bank row MUX 1106-0 uses the baseline bank value in combination with the final bank lookup table 900 of FIG. 9 to produce final bank output for a final bank column MUX 1108-00. A line-offset MUX 1110-0 uses a value in a Line1x flip-flop 1104 in combination with the LineOffset-to-Bank lookup table 700 of FIG. 7 to implement Equation (2) to produce a bank output for the final bank column MUX 1108-00. The final bank column MUX 1108-00 uses the final bank output from the final bank row MUX 1106-0 in combination with the bank output from the line-offset MUX 1110-0 to implement Equation (1) and output a bank value 1102-00 for L0/CS0.

Similarly, a final bank column MUX 1108-01 uses a final bank output from a final bank row MUX 1106-1 in combination with the bank output from the line-offset MUX 1110-0 to implement Equation (1) and output a bank value 1102-01 for L0/CS1.

Similarly, a final bank column MUX 1108-04 uses a final bank output from a final bank row MUX 1106-4 in combination with the bank output from the line-offset MUX 1110-0 to implement Equation (1) and output a bank value 1102-04 for L0/CS4.

A line-offset MUX 1110-1 uses a value one greater than the value in the Line1x flip-flop 1104 in combination with the LineOffset-to-Bank lookup table 700 of FIG. 7 to produce bank output for a final bank column MUX 1108-10.

The final bank column MUX 1108-10 uses a final bank output from the final bank row MUX 1106-0 in combination with the bank output from the line-offset MUX 1110-1 to implement Equation (1) and output a bank value 1102-10 for L1/CS0.

Similarly, a final bank column MUX 1108-11 uses a final bank output from the final bank row MUX 1106-1 in combination with the bank output from the line-offset MUX 1110-1 to implement Equation (1) and output a bank value 1102-11 for L1/CS1.

Similarly, a final bank column MUX 1108-14 uses a final bank output from the final bank row MUX 1106-4 in combination with the bank output from the line-offset MUX 1110-1 to implement Equation (1) and output a bank value 1102-14 for L1/CS4.

In FIG. 12, a line-offset MUX 1110-7 uses a value seven greater than the value in the Line1x flip-flop 1104 in combination with the LineOffset-to-Bank lookup table 700 of FIG. 7 to produce bank output for a final bank column MUX 1108-70.

The final bank column MUX 1108-70 uses a final bank output from the final bank row MUX 1106-0 in combination with the bank output from the line-offset MUX 1110-7 to implement Equation (1) and output a bank value 1102-70 for L7/CS0.

Similarly, a final bank column MUX 1108-71 uses a final bank output from the final bank row MUX 1106-1 in combination with the bank output from the line-offset MUX 1110-7 to implement Equation (1) and output a bank value 1102-71 for L7/CS1.

Similarly, a final bank column MUX 1108-74 uses a final bank output from the final bank row MUX 1106-4 in combination with the bank output from the line-offset MUX 1110-7 to implement Equation (1) and output a bank value 1102-74 for L7/CS4.

A line-offset MUX 1110-31 uses a value 31 greater than the value in the Line1x flip-flop 1104 in combination with the LineOffset-to-Bank lookup table 700 of FIG. 7 to produce bank output for a final bank column MUX 1108-310.

The final bank column MUX 1108-310 uses a final bank output from the final bank row MUX 1106-0 in combination with the bank output from the line-offset MUX 1110-31 to implement Equation (1) and output a bank value 1102-310 for L31/CS0.

Figure 13:
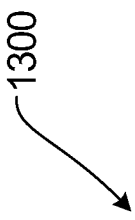
FIG. 13 illustrates a LineOffset-to-Sub-Bank lookup table, according to aspects of the present application.

FIG. 13 illustrates a LineOffset-to-Sub-Bank lookup table 1300. The first column of the table 1300 of FIG. 13 shows an actual memory line offset, relative to the value in the Line1x flip-flop 1104. For example, if the value in the Line1x flip-flop 1104 is 49 and an operation is to access 32 lines, then the last line offset is 49+31=80. The table 1300 of FIG. 13 can be used for simultaneous lookups for rows of multiple matrix elements, not just the row of first matrix element. Notably, the LineOffset-to-Sub-Bank lookup table 1300 of FIG. 13 is small enough that it may be hard-wired.

The LineOffset-to-Sub-Bank lookup table 1300 of FIG. 13 may be considered to answer the question, "Given that a particular set of elements of the data matrix is on a particular row (LineOffset or "Line1x") left as a remainder when the number of rows in the data matrix is divided by 50, what should be the sub-bank for storage of the particular set of elements of the data matrix?" That is, the LineOffset-to-Sub-Bank lookup table 1300 of FIG. 13 may be considered to assist in the implementation of Equation (9), as follows:

Sub-Bank(Line Offset)=(Line Offset>>1)mod 5  (9)

Figure 14:
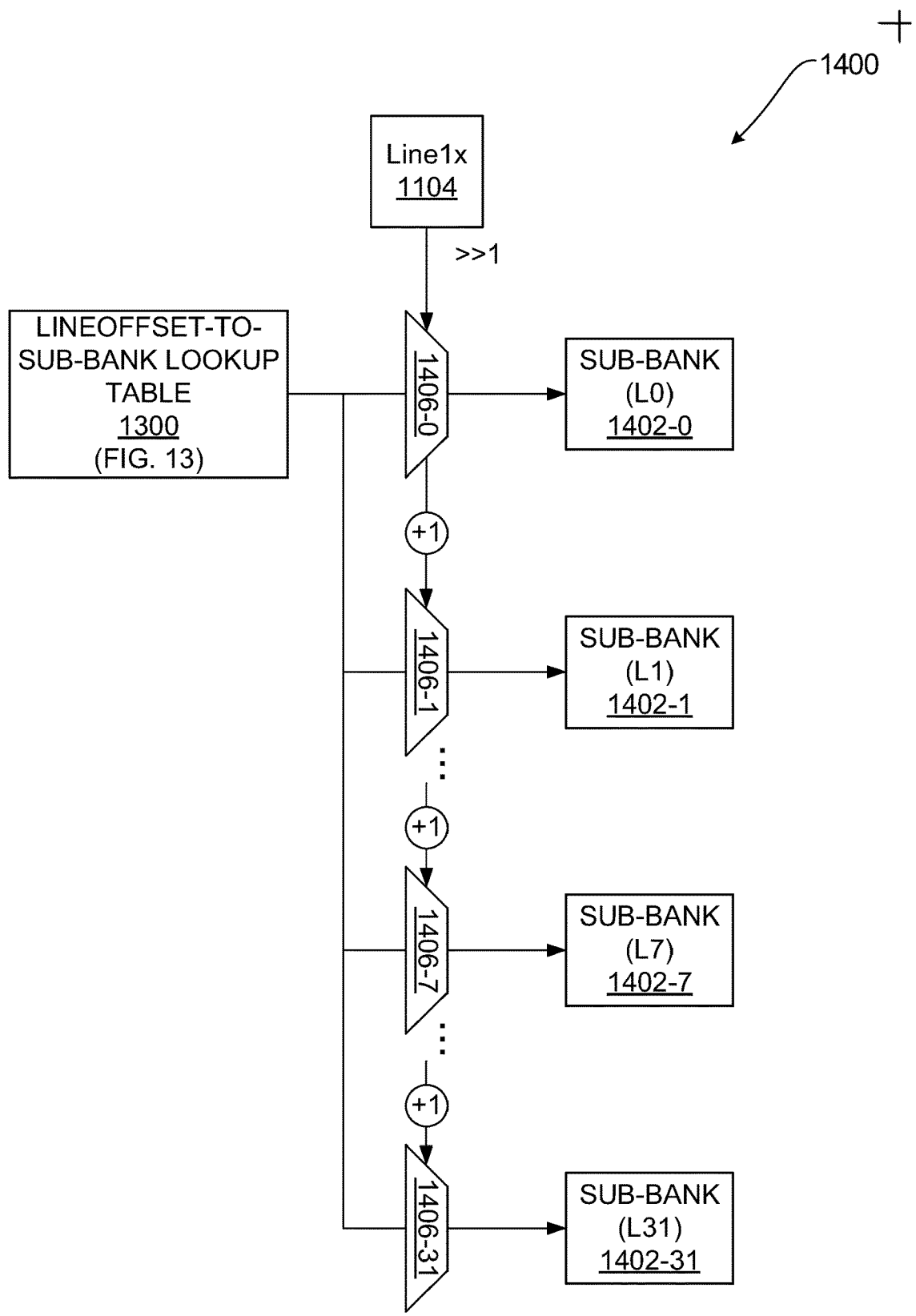
FIG. 14 illustrates an example sub-bank address generation circuit, according to aspects of the present application.

FIG. 14 illustrates an example sub-bank address generation circuit 1400.

A sub-bank MUX 1406-0 uses Line1x flip-flop 1104 in combination with the LineOffset-to-Sub-Bank lookup table 1300 of FIG. 13 to produce a sub-bank output 1402-0.

A sub-bank MUX 1406-1 uses a value one greater than the value in the Line1x flip-flop 1104 in combination with the LineOffset-to-Sub-Bank lookup table 1300 of FIG. 13 to produce sub-bank output 1402-1.

A sub-bank MUX 1406-7 uses a value seven greater than the value in the Line1x flip-flop 1104 in combination with the LineOffset-to-Sub-Bank lookup table 1300 of FIG. 13 to produce sub-bank output 1402-7.

A sub-bank MUX 1406-31 uses a value 31 greater than the value in the Line1x flip-flop 1104 in combination with the LineOffset-to-Sub-Bank lookup table 1300 of FIG. 13 to produce sub-bank output 1402-31.

FIG. 15 illustrates a Div 50/Mod 50 lookup table 1500 that may be considered to be formed from two, smaller look-up tables: a Div-50 look-up table; and a Mod-50 look-up table. The Div-50 look-up table and the Mod-50 table may be hard-wired.

Figure 16:
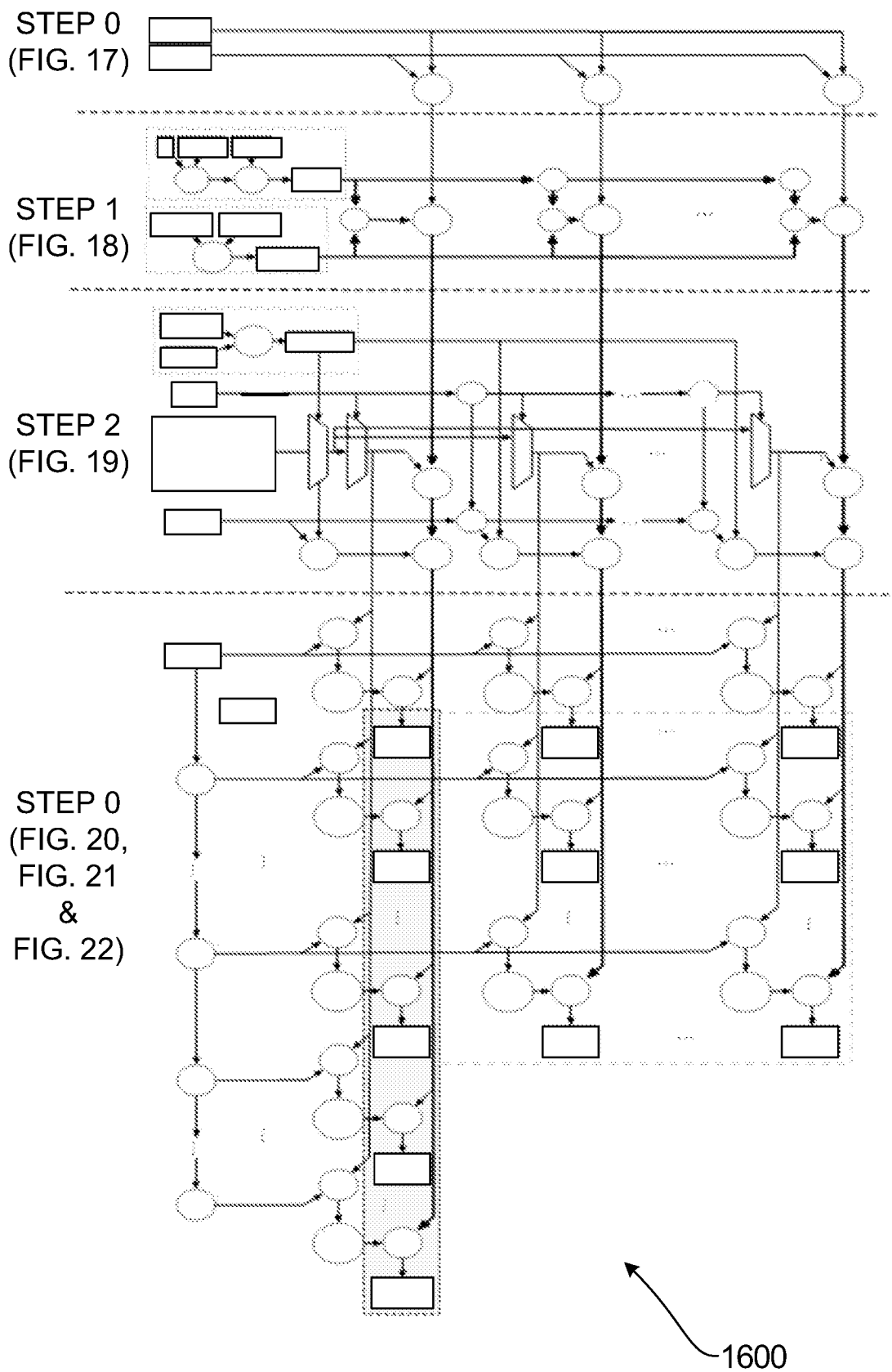
FIG. 16 illustrates an example memory entry address generation circuit that includes a step 0, a step 1, a step 2 and a step 3, according to aspects of the present application.
Figure 17:
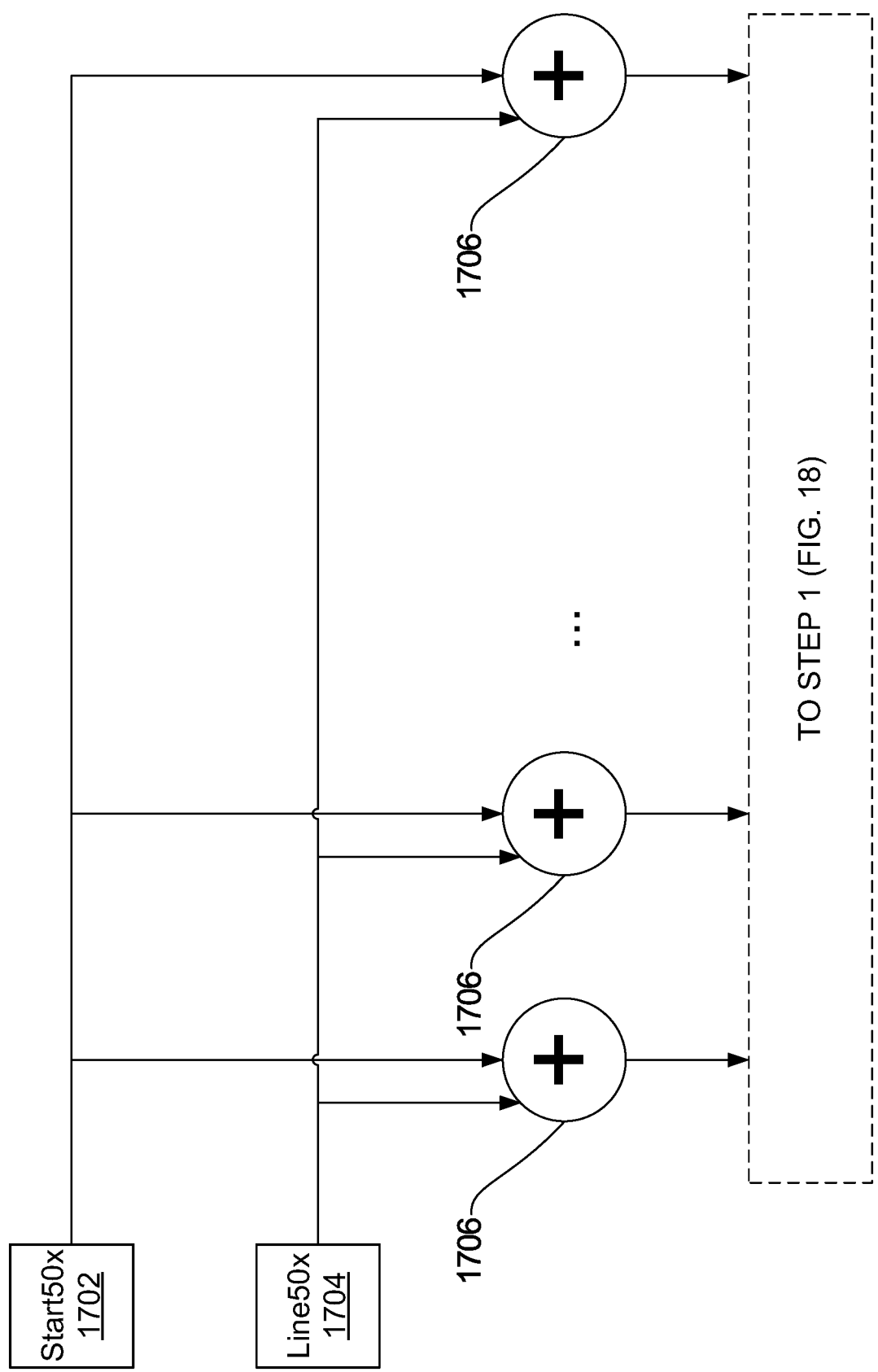
FIG. 17 illustrates an example implementation of step 0 in the example memory entry address generation circuit of FIG. 16, according to aspects of the present application.
Figure 18:
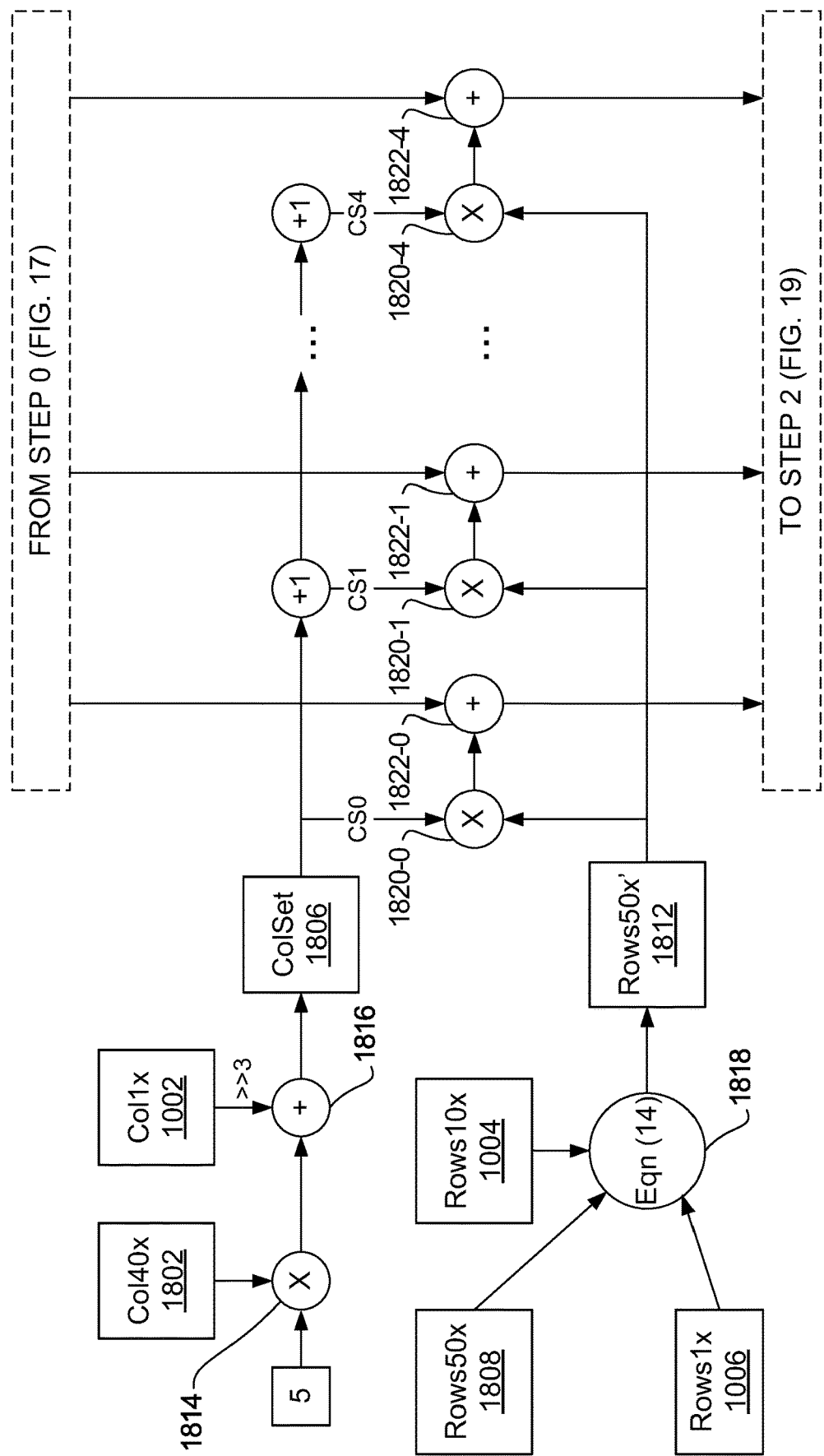
FIG. 18 illustrates an example implementation of step 1 in the example memory entry address generation circuit of FIG. 16, according to aspects of the present application.
Figure 19:
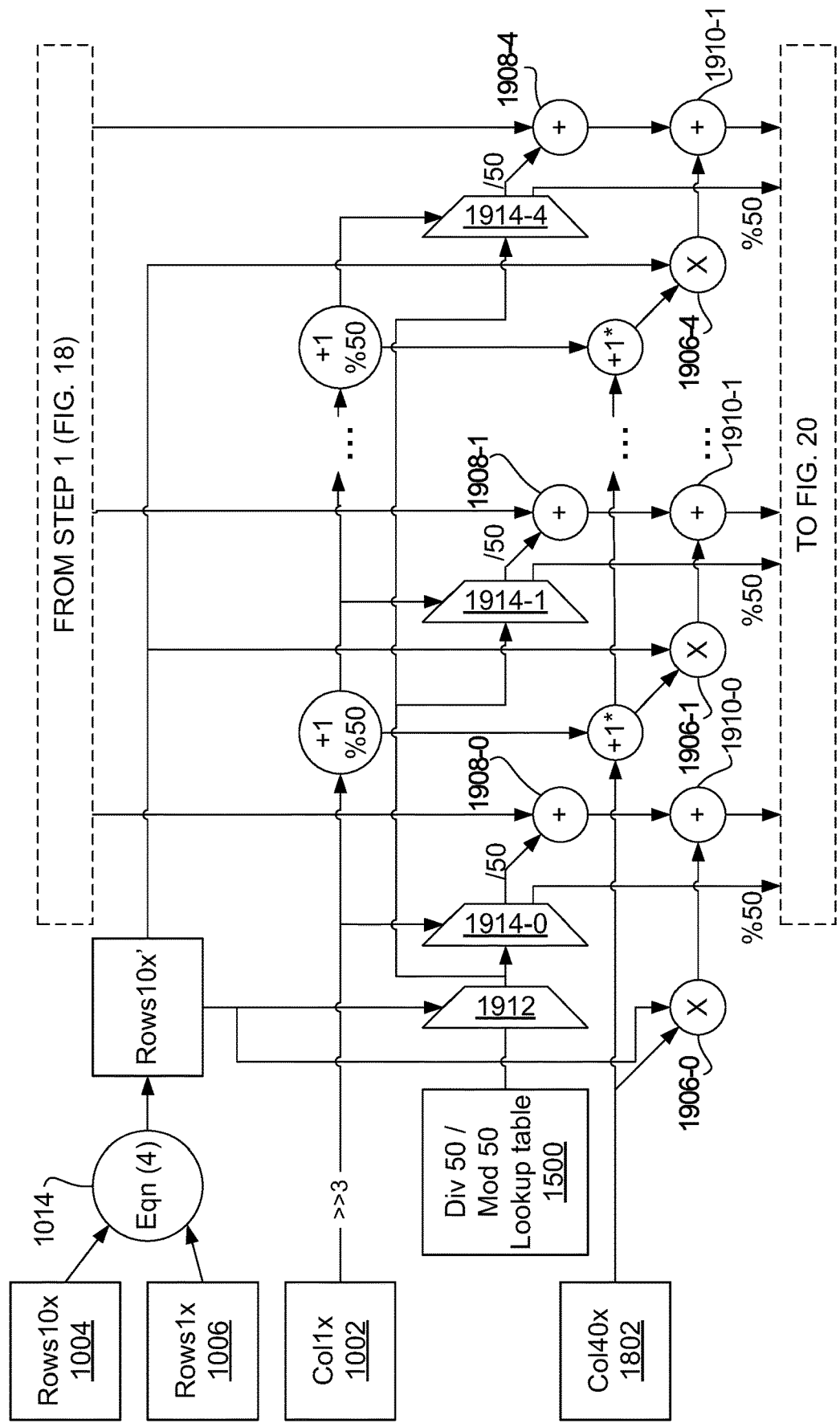
FIG. 19 illustrates an example implementation of step 2 in the example memory entry address generation circuit of FIG. 16, according to aspects of the present application.

An example memory entry address generation circuit 1600 is illustrated in overview in FIG. 16. The example entry address generation circuit 1600 is designed to support both 8×32E (line-major access) and 32×8E (column-major access). The example entry address generation circuit 1600 is illustrated as having multiple steps: step 0; step 1; step 2; and step 3. Step 0 is illustrated in FIG. 17. Step 1 is illustrated in FIG. 18. Step 2 is illustrated in FIG. 19. Step 3 is illustrated in a combination of FIGS. 20, 21 and 22. The steps of the example entry address generation circuit 1600 work to produce an Entry Address according to an Equation (10), as follows.

Entry Address=(((Step 0+Step 1)+Step 2a-Quotient)+
Step 2b-Quotient)+Step 3  (10)

To ease timing concerns, certain elements of the example entry address generation circuit 1600 can be implemented as pipeline stages. In fact, it is possible to perform the entire Step 0, 1 and 2 ahead of time (i.e., within pipeline stages from firmware until the request is at the Memory Segment), thereby reducing lengths of the critical paths (bolded lines).

FIG. 17 illustrates step 0 of the example entry address generation circuit 1600 of FIG. 16. Step 0 may be seen to implement an Equation (11), as follows:

Step 0=Start50$x$+Line50$x$.  (11)

In FIG. 17, a Start50x flip-flop 1702 and a Line50x flip-flop 1704 are represented as providing input to a plurality of addition operators 1706.

FIG. 18 illustrates step 1 of the example entry address generation circuit 1600 of FIG. 16. Step 1 may be seen to implement an Equation (12), as follows:

Step 1=ColSet*Rows50$x$'  (12)

A Col40x flip-flop 1802 is multiplied by five at a multiplication operator 1814 with the product received at an addition operator 1816, where the product is added to a value resulting from using the value in the Col1x flip-flop 1002 in Equation (3). The sum, the Absolute Column Set #, is called ColSet 1806.

The maximum product in Equation (12) may be configured so that the product does not exceed 128, which may be represented using eight bits, due to the 2K rows×2K columns restriction, as well as the maximum Segment capacity being 51,200 entries (16B per entry). Hence, it is expected that the number of levels of logic to compute Equation (12) will be minimal.

The combination of the value in the Col40x flip-flop 1802, the multiplication operator 1814, the addition operator 1816 and a value resulting from using the value in the Col1x flip-flop 1002 in Equation (3) may be seen to implement an Equation (13), as follows:

ColSet=(Col40$x$*5)+(Col1$x$>>3).  (13)

Notably, Col40x*5 can be implemented as Col40x<<2+ Col40x in hardware.

An operator 1818 implementing Equation (14), as follows, receives input from a Rows50x flip-flop 1808 and the Rows10x flip-flop 1004. The result of implementing Equation (14), as follows, is Rows50x' 1812.

Rows50$x$'=((Rows10$x$==4)&(Rows1$x$!=0))
?Rows50$x$+1:Rows50$x$  (14)

A multiplication operator 1820-0 forms a product from the ColSet 1806 and the Rows50x' 1812, thereby implementing Equation (12). The product is added to the output of Step 0 at an addition operator 1822-0 to, thereby, implement the first operation of Equation (10).

A multiplication operator 1820-1 forms a product from a number one greater than the ColSet 1806 and the Rows50x' 1812, which product is added to the output of Step 0 at an addition operator 1822-1 to, thereby, implement the first operation of Equation (10).

A multiplication operator 1820-4 forms a product from a number four greater than the ColSet 1806 and the Rows50x' 1812, which product is added to the output of Step 0 at an addition operator 1822-4 to, thereby, implement the first operation of Equation (10).

FIG. 19 illustrates step 2 of the example entry address generation circuit 1600 of FIG. 16. Step 2 may be seen to implement a set of Equations (15a), (15b) and (16), as follows:

Step2a-Quotient=Div-50Lookup Table[CS (Equation
3)][Rows10$x$' (Equation4)]  (15a)

Step2b-Quotient=Col40$x$*Rows10$x$' (Equation 4)  (15b)

Step2-Remainder=Mod-50 Lookup Table[CS (Equation 3)][Rows10$x$' (Equation 4)]  (16)

The value for Rows10x' may be one of {1, 2, 3, 4}. Hence, Equation (15b) should be a simple hardware multiplication, given that 1, 2 and 4 are powers 0, 1 and 2 of 2 and 3 is simply 2+1.

The logic operator 1014 (seen first in FIG. 10) receives values from the Rows10x flip-flop 1004 and the Rows1x flip-flop 1006 and produces Rows10x' as output, thereby implementing Equation (4). A DivMod Mux 1912 uses the Rows10x' to select a column of the Div-50 look-up table and a column of the Mod-50 table, both from the Div 50/Mod 50 lookup table 1500 of FIG. 15.

A row selection Mux 1914-0 uses a value resulting from using the value in the Col1x flip-flop 1002 in Equation (3) to select a row in the column of the Div-50 look-up table 1500, which column has been received from the DivMod Mux 1912, thereby implementing Equation (15a). The row selection Mux 1914-0 also uses the value resulting from using the value in the Col1x flip-flop 1002 in Equation (3) to select a row in the column of the Mod-50 look-up table 1500 received from the DivMod Mux 1912, thereby implementing Equation (16).

A division Mux 1914-1 uses a value one greater than the value resulting from using the value in the Col1x flip-flop 1002 in Equation (3) (mod 50) to select a row in the column of the Div-50 look-up table 1500, which column has been received from the DivMod Mux 1912, thereby implementing Equation (15a). The row selection Mux 1914-1 also uses a value one greater than the value resulting from using the value in the Col1x flip-flop 1002 in Equation (3) to select a row in the column of the Mod-50 look-up table 1500, which column has been received from the DivMod Mux 1912, thereby implementing Equation (16).

A division Mux 1914-4 uses a value four greater than the value resulting from using the value in the Col1x flip-flop 1002 in Equation (3) to select a row in the column of the Div-50 look-up table received from the DivMod Mux 1912, thereby implementing Equation (15a) to produce Div-50 output. The row selection Mux 1914-4 also uses a value four greater than the value resulting from using the value in the Col1x flip-flop 1002 in Equation (3) to select a row in the column of the Mod-50 look-up table received from the DivMod Mux 1912, thereby implementing Equation (16) to produce Mod-50 (%50) output. A multiplication operator 1906-0 determines a product of the Col40x flip-flop 1802 and the Rows10x', thereby implementing Equation (15b).

A multiplication operator 1906-1 determines a product of a value one greater than the Col40x flip-flop 1802 and the Rows10x', thereby implementing Equation (15b).

A multiplication operator 1906-4 determines a product of a value four greater than the Col40x flip-flop 1802 and the Rows10x', thereby implementing Equation (15b).

When Col1x is incremented, Col40x may also be incremented. Col40x is incremented by 1 only if (FLOOR (Col1x>>3)+1) %5==0, e.g., for columns 32 to 39, FLOOR (Col1x/8)==4, so Col40x will be incremented. This is also evident from FIG. 15, where only Col40x==0 is shown. The next set of five rows will have Col40x==1.

At an addition operator 1908-0, the Div-50 output of the row selection Mux 1914-0 is added to step 1 output to, thereby, implement the second operation of Equation (10).

At an addition operator 1908-1, the Div-50 output of the row selection Mux 1914-1 is added to step 1 output to, thereby, implement the second operation of Equation (10).

At an addition operator 1908-4, the Div-50 output of the row selection Mux 1914-4 is added to step 1 output to, thereby, implement the second operation of Equation (10).

At an addition operator 1910-0, the output of the addition operator 1908-0 is added to the output of the multiplication operator 1906-0 to, thereby, implement the third operation of Equation (10).

At an addition operator 1910-1, the output of the addition operator 1908-1 is added to the output of the multiplication operator 1906-1 to, thereby, implement the third operation of Equation (10).

At an addition operator 1910-4, the output of the addition operator 1908-4 is added to the output of the multiplication operator 1906-4 to, thereby, implement the third operation of Equation (10).

Figure 20:
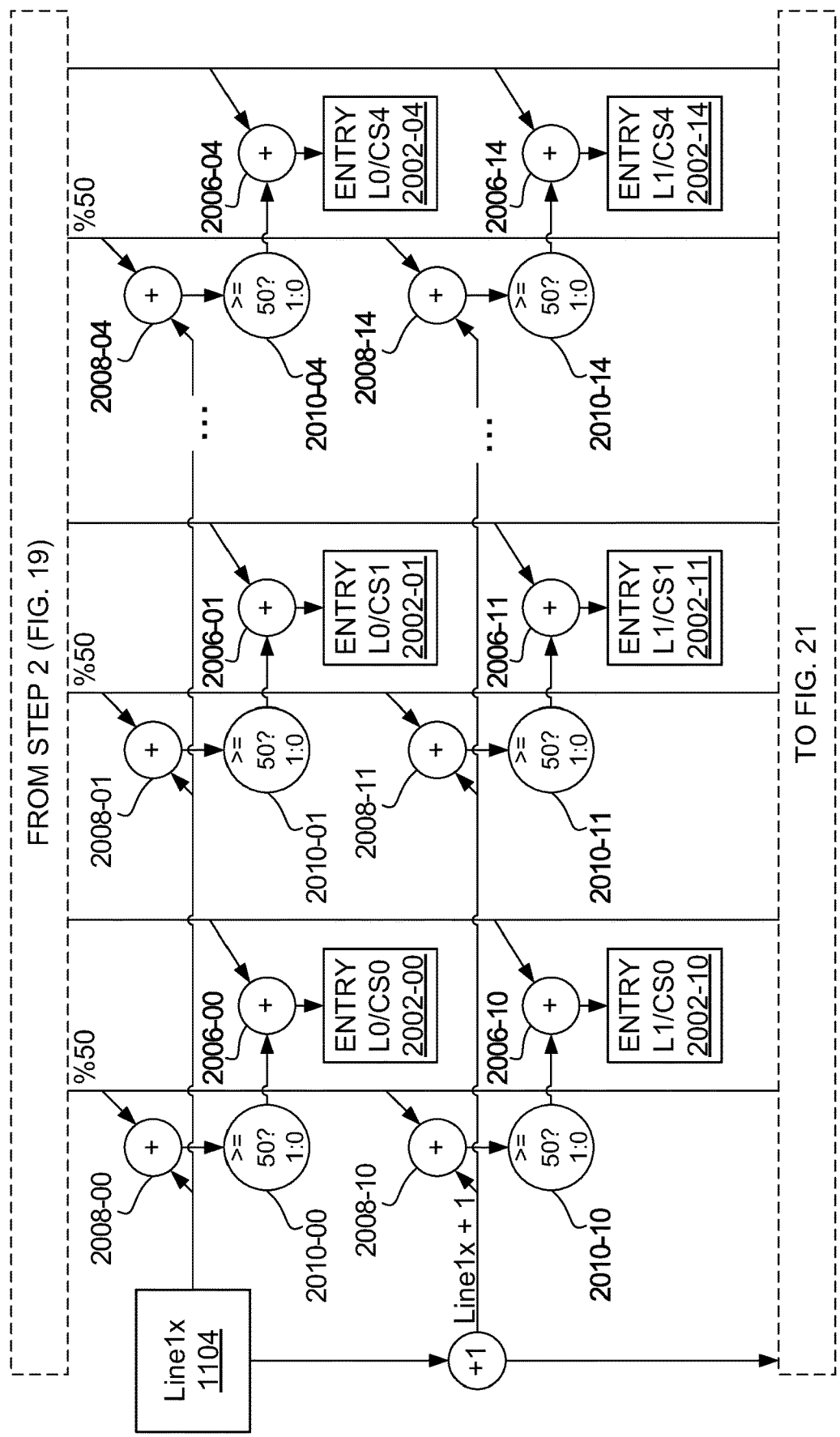
FIG. 20 illustrates an example implementation of a first portion of step 3 in the example memory entry address generation circuit of FIG. 16, according to aspects of the present application.

FIG. 20 illustrates a first portion of step 3 of the example entry address generation circuit 1600 of FIG. 16. Overall, step 3 of the example entry address generation circuit 1600 may be seen to implement a pair of Equations (17) and (18), as follows:

$$\text{Step3}a = \text{Step2-Remainder} + \text{Line1}x \qquad (17)$$

$$\text{Step3} = (\text{Step3}a \geq 100)?2:(\text{Step3}a \geq 50)?1:0. \qquad (18)$$

An addition operator 2006-00 in FIG. 20 receives output from the addition operator 1910-0 (FIG. 19), which output is representative of four fifths of the sum of Equation (10). Furthermore, an addition operator 2008-00 receives the Mod-50 (%50) output from the addition operator 1914-0 (FIG. 19) representative of a step 2 remainder. The addition operator 2008-00 adds the Mod-50 (%50) output to the value in the Line1x flip-flop 1104 to form a sum. A decision operator 2010-00 receives the sum from the addition operator 2008-00 and implements Equation (18). The addition operator 2006-00 adds the sum to the output from the addition operator 1910-0 to, thereby complete the implementation of Equation (10) and produce a reference to an entry L0/CS0 2002-00.

An addition operator 2006-01 in FIG. 20 receives output from the addition operator 1910-1 (FIG. 19), which output is representative of four fifths of the sum of Equation (10). Furthermore, an addition operator 2008-01 receives the Mod-50 (%50) output from the addition operator 1914-1 (FIG. 19) representative of a step 2 remainder. The addition operator 2008-01 adds the Mod-50 (%50) output to the value in the Line1x flip-flop 1104 to form a sum. A decision operator 2010-01 receives the sum from the addition operator 2008-00 and implements Equation (18). The addition operator 2006-00 adds the sum to the output from the addition operator 1910-1 to, thereby complete the implementation of Equation (10) and produce a reference to an entry L0/CS1 2002-01.

An addition operator 2006-04 in FIG. 20 receives output from the addition operator 1910-4 (FIG. 19), which output is representative of four fifths of the sum of Equation (10). Furthermore, an addition operator 2008-04 receives the Mod-50 (%50) output from the addition operator 1914-4 (FIG. 19) representative of a step 2 remainder. The addition operator 2008-04 adds the Mod-50 (%50) output to the value in the Line1x flip-flop 1104 to form a sum. A decision operator 2010-04 receives the sum from the addition operator 2008-04 and implements Equation (18). The addition operator 2006-04 adds the sum to the output from the addition operator 1910-4 to, thereby complete the implementation of Equation (10) and produce a reference to an entry L0/CS4 2002-04.

An addition operator 2006-10 in FIG. 20 receives output from the addition operator 1910-0 (FIG. 19), which output is representative of four fifths of the sum of Equation (10). Furthermore, an addition operator 2008-10 receives the Mod-50 (%50) output from the addition operator 1914-0 (FIG. 19) representative of a step 2 remainder. The addition operator 2008-10 adds the Mod-50 (%50) output to a value one greater than the value in the Line1x flip-flop 1104 to form a sum. A decision operator 2010-10 receives the sum from the addition operator 2008-10 and implements Equation (18). The addition operator 2006-10 adds the sum to the output from the addition operator 1910-0 to, thereby complete the implementation of Equation (10) and produce a reference to an entry L1/CS0 2002-10.

An addition operator 2006-11 in FIG. 20 receives output from the addition operator 1910-1 (FIG. 19), which output is representative of four fifths of the sum of Equation (10). Furthermore, an addition operator 2008-11 receives the Mod-50 (%50) output from the addition operator 1914-1 (FIG. 19) representative of a step 2 remainder. The addition operator 2008-11 adds the Mod-50 (%50) output to a value one greater than the value in the Line1x flip-flop 1104 to form a sum. A decision operator 2010-11 receives the sum from the addition operator 2008-11 and implements Equation (18). The addition operator 2006-11 adds the sum to the output from the addition operator 1910-1 to, thereby complete the implementation of Equation (10) and produce a reference to an entry L1/CS1 2002-11.

An addition operator 2006-14 in FIG. 20 receives output from the addition operator 1910-4 (FIG. 19), which output is representative of four fifths of the sum of Equation (10). Furthermore, an addition operator 2008-14 receives the Mod-50 (%50) output from the addition operator 1914-4 (FIG. 19) representative of a step 2 remainder. The addition operator 2008-14 adds the Mod-50 (%50) output to a value one greater than the value in the Line1x flip-flop 1104 to form a sum. A decision operator 2010-14 receives the sum from the addition operator 2008-14 and implements Equation (18). The addition operator 2006-14 adds the sum to the output from the addition operator 1910-4 to, thereby complete the implementation of Equation (10) and produce a reference to an entry L1/CS4 2002-14.

Figure 21:
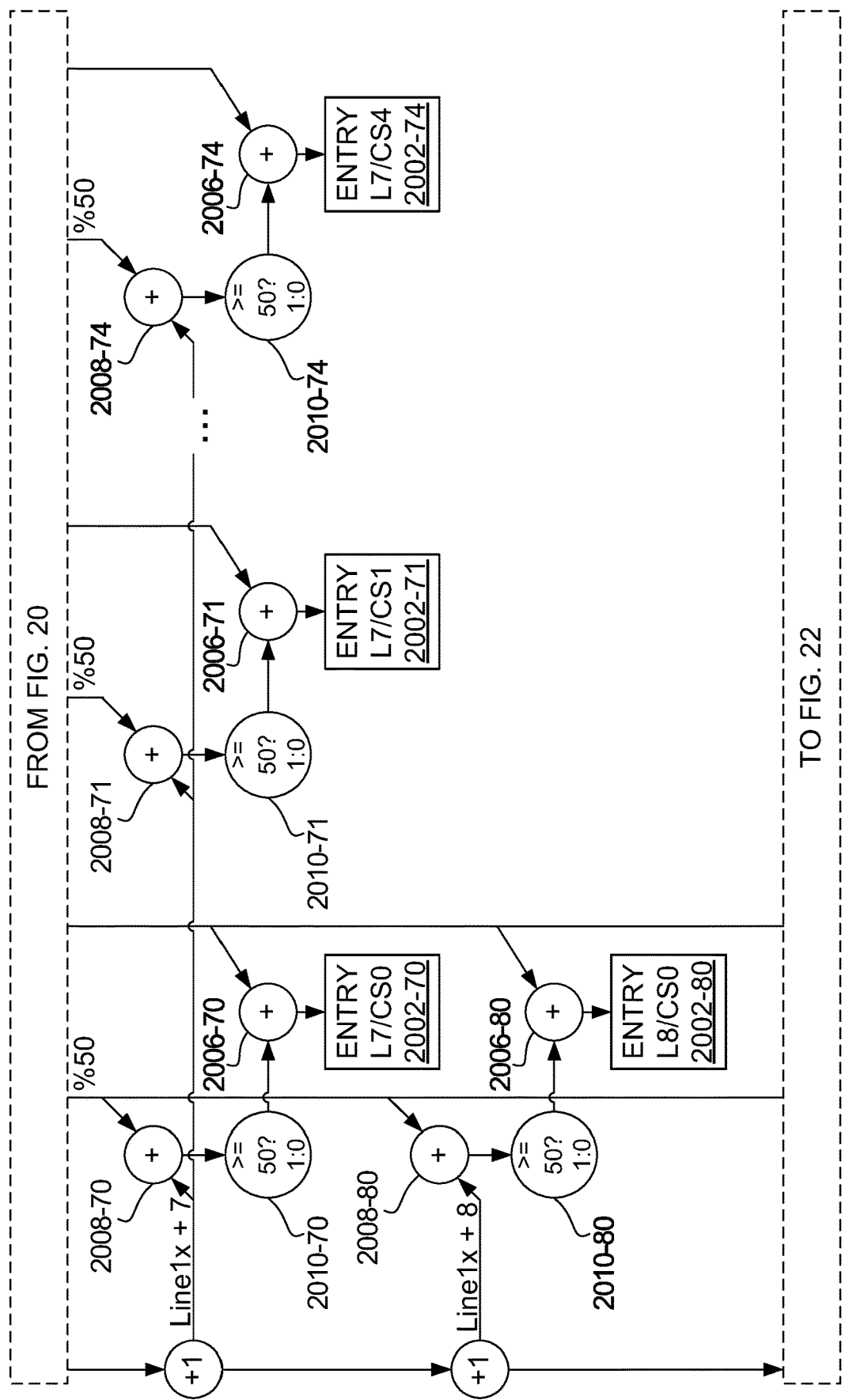
FIG. 21 illustrates an example implementation of a second portion of step 3 in the example memory entry address generation circuit of FIG. 16, according to aspects of the present application.

FIG. 21 illustrates a second portion (step 3B) of step 3 of the example entry address generation circuit 1600 of FIG. 16.

An addition operator 2006-70 in FIG. 21 receives output from the addition operator 1910-0 (FIG. 19), which output is representative of four fifths of the sum of Equation (10). Furthermore, an addition operator 2008-70 receives the Mod-50 (%50) output from the addition operator 1914-0 (FIG. 19) representative of a step 2 remainder. The addition operator 2008-70 adds the Mod-50 (%50) output to a value seven greater than the value in the Line1x flip-flop 1104 to form a sum. A decision operator 2010-70 receives the sum from the addition operator 2008-70 and implements Equation (18). The addition operator 2006-70 adds the sum to the output from the addition operator 1910-0 to, thereby complete the implementation of Equation (10) and produce a reference to an entry L7/CS0 2002-70.

An addition operator 2006-71 in FIG. 21 receives output from the addition operator 1910-1 (FIG. 19), which output is representative of four fifths of the sum of Equation (10). Furthermore, an addition operator 2008-71 receives the Mod-50 (%50) output from the addition operator 1914-1 (FIG. 19) representative of a step 2 remainder. The addition operator 2008-71 adds the Mod-50 (%50) output to a value seven greater than the value in the Line1x flip-flop 1104 to form a sum. A decision operator 2010-71 receives the sum from the addition operator 2008-71 and implements Equation (18). The addition operator 2006-71 adds the sum to the output from the addition operator 1910-1 to, thereby complete the implementation of Equation (10) and produce a reference to an entry L7/CS1 2002-71.

An addition operator 2006-74 in FIG. 21 receives output from the addition operator 1910-4 (FIG. 19), which output is representative of four fifths of the sum of Equation (10). Furthermore, an addition operator 2008-74 receives the Mod-50 (%50) output from the addition operator 1914-4 (FIG. 19) representative of a step 2 remainder. The addition operator 2008-74 adds the Mod-50 (%50) output to a value seven greater than the value in the Line1x flip-flop 1104 to form a sum. A decision operator 2010-74 receives the sum from the addition operator 2008-74 and implements Equation (18). The addition operator 2006-74 adds the sum to the output from the addition operator 1910-4 to, thereby complete the implementation of Equation (10) and produce a reference to an entry L7/CS4 2002-74.

An addition operator 2006-80 in FIG. 21 receives output from the addition operator 1910-0 (FIG. 19), which output is representative of four fifths of the sum of Equation (10). Furthermore, an addition operator 2008-80 receives the Mod-50 (%50) output from the addition operator 1914-0 (FIG. 19) representative of a step 2 remainder. The addition operator 2008-80 adds the Mod-50 (%50) output to a value eight greater than the value in the Line1x flip-flop 1104 to form a sum. A decision operator 2010-80 receives the sum from the addition operator 2008-80 and implements Equation (18). The addition operator 2006-80 adds the sum to the output from the addition operator 1910-0 to, thereby complete the implementation of Equation (10) and produce a reference to an entry L8/CS0 2002-80.

Figure 22:
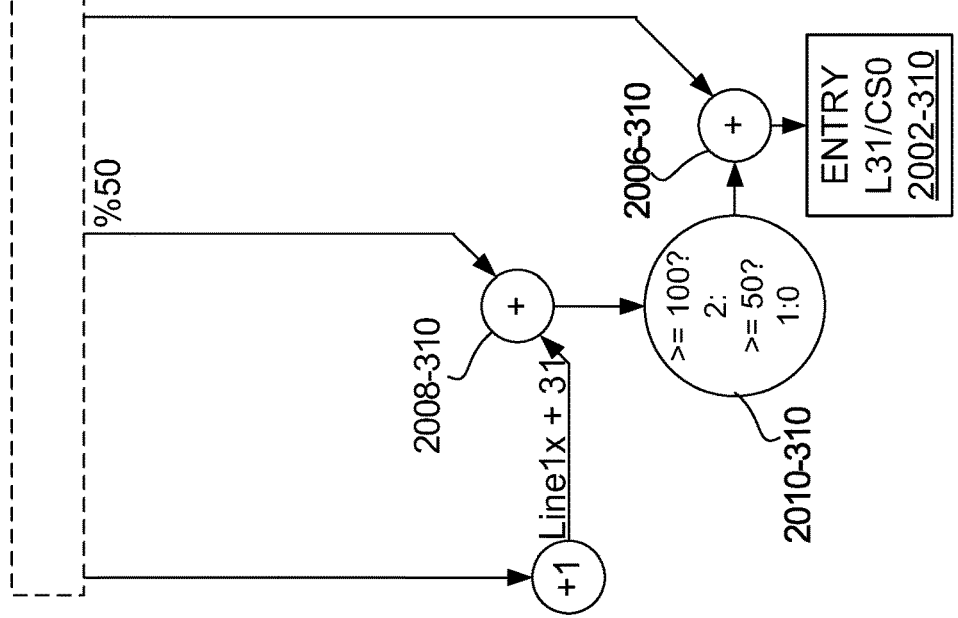
FIG. 22 illustrates an example implementation of a third portion of step 3 in the example memory entry address generation circuit of FIG. 16, according to aspects of the present application.

FIG. 22 illustrates a third portion (step 3C) of step 3 of the example entry address generation circuit 1600 of FIG. 16.

An addition operator 2006-310 in FIG. 22 receives output from the addition operator 1910-0 (FIG. 19), which output is representative of four fifths of the sum of Equation (10). Furthermore, an addition operator 2008-310 receives the Mod-50 (%50) output from the addition operator 1914-0 (FIG. 19) representative of a step 2 remainder. The addition operator 2008-310 adds the Mod-50 (%50) output to a value 31 greater than the value in the Line1x flip-flop 1104 to form a sum. A decision operator 2010-310 receives the sum from the addition operator 2008-310 and implements Equation (18). The addition operator 2006-310 adds the sum to the output from the addition operator 1910-0 to, thereby complete the implementation of Equation (10) and produce a reference to an entry L31/CS0 2002-310.

The descriptions hereinbefore illustrate a manner in which Bank values are determined (see FIGS. 10, 11 and 12), a manner in which Sub-Bank values are determined (see FIG. 14) and a manner in which Entry values are determined (see FIGS. 16 through 22), each value being determined, per line and per column. The values are translated by the address translation circuit 504 (FIG. 5) to appropriately drive addressing signals, on the address and control signal bus, to the memory tiles 102 of the memory segment 100.

Figure 23:
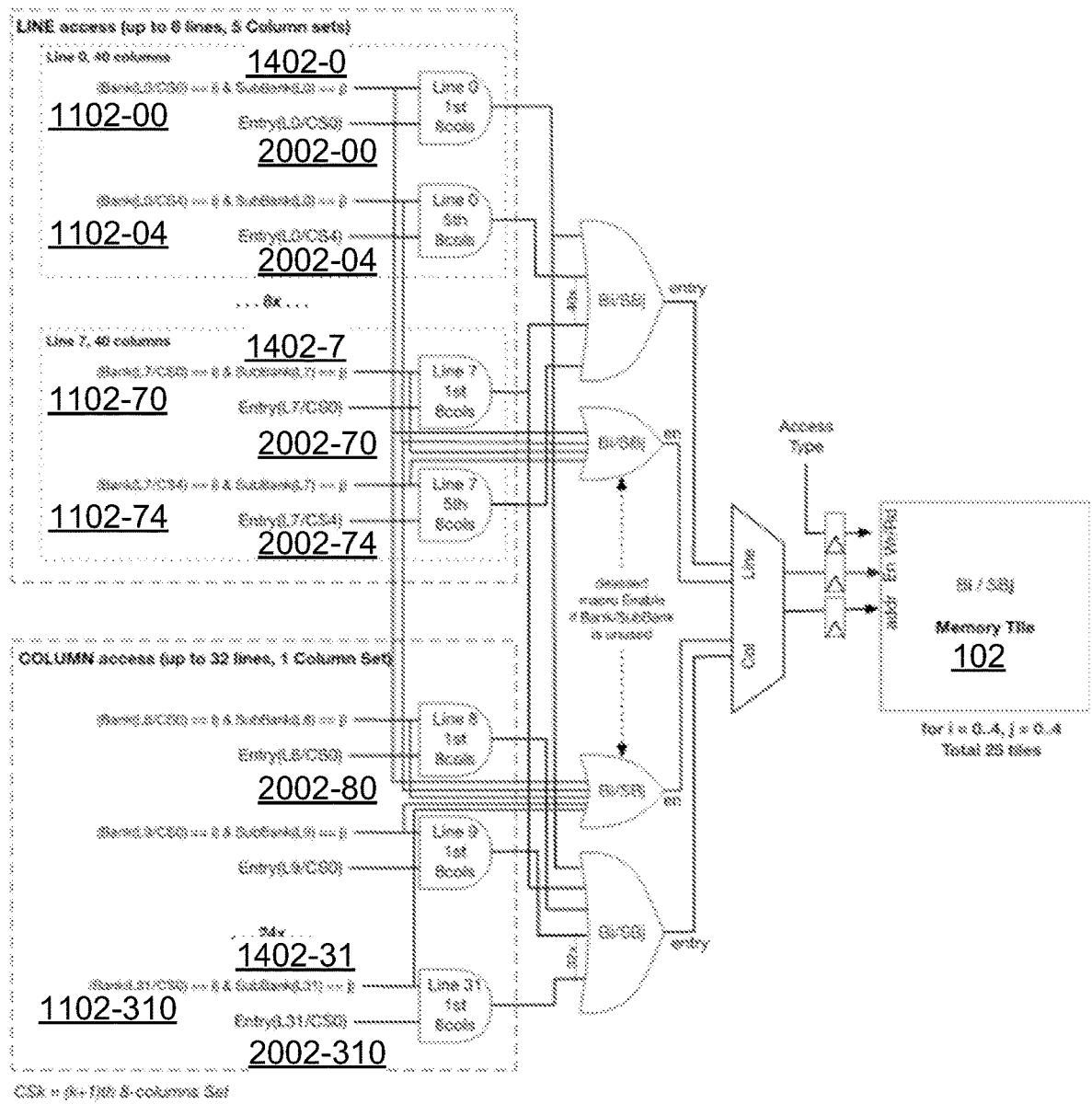
FIG. 23 illustrates a high-level addressing circuit, according to aspects of the present application.

FIG. 23 illustrates an example high-level addressing circuit 2300.

The Bank output (LX/CSY) 1102-XY from FIG. 11 and FIG. 12, the Sub-Bank output (LX) 1400-X from FIG. 14 and the Entry output (LX/CSY) 2002-XY from FIGS. 20, 21 and 22 are represented, in the example high-level memory addressing circuit 2300 of FIG. 23.

When two consecutive (even/odd) lines are targeting the same Bank/Sub-Bank, their Entry values computed will always be same and, hence, it may be considered that the AND-OR tree structure in the example high-level memory addressing circuit 2300 of FIG. 23 can combine the line without collision.

Each memory tile 102, in the local memory segment 100, may be considered to be a unit of memory structure that carries multiple memory elements, wherein each memory element is a one-dimensional memory structure. Multiple memory tiles make up a memory segment. By structuring the memory tiles 102 and a mapping matrix to the memory tiles 102, within a memory segment, it may be shown that non-blocking, concurrent write and read accesses to the local memory for multiple requestors 500 (FIG. 5), 600 (FIG. 6) may be achieved with relatively high throughput. The accesses may be either row-major or column-major for the memory segment 100.

As discussed hereinbefore, the example bank address generation circuit illustrated across FIGS. 10, 11 and 12 receives: the value output from the value in the Col1x flip-flop 1002; the value in the Rows10x flip-flop 1004; the value in the Rows1x flip-flop 1006; and the value in the Line1x flip-flop 1104.

The example sub-bank address generation circuit 1400 of FIG. 14 receives, as input, the value in the Line1x flip-flop 1104.

The example entry address generation circuit 1600 of FIG. 16 receives, as input: in Step 0, the value in the Start50x flip-flop 1702 and the value in the Line50x 1704; in Step 1, the value in the Col40x flip-flop 1802, the value in the Col1x flip-flop 1002, the value in the Rows50x flip-flop 1808 and the value in the Rows10x flip-flop 1004; in Step 2, the value in the Rows10x flip-flop 1004, the value in the Rows1x flip-flop 1006, the value in the Col1x flip-flop 1002 and the value in the Col40x flip-flop 1802; and, in Step 3, the value in the Line1x flip-flop 1104.

The circuit 2300 of FIG. 23 receives, as input: the Bank output (LX/CSY) 1102-XY from example bank address generation circuit illustrated across FIGS. 10, 11 and 12; the Sub-Bank output (LX) 1400-X from example sub-bank address generation circuit 1400 of FIG. 14; and the Entry output (LX/CSY) 2002-XY from Step 3 of the example entry address generation circuit 1600, as illustrated in FIGS. 20, 21 and 22.

In the first example matrix 302 of the table 300 of example mappings of matrix elements in FIG. 3, to generate an address for a memory entry, the number of the memory entry is incremented once every 50 lines. The Access Mode for the first example matrix 302 is row-major, which may also be expressed as 8×32E. the Matrix Start Line is 0 (Start50x=0). The number of matrix rows is 172. Accordingly, the respective values of Rows50x/Rows10x/Rows1x are 3/2/2.

Step 1 of the example entry address generation circuit 1600, illustrated in FIG. 18, as part of the address translation circuit 504 of FIGS. 5 and 6, uses the implementation of Equation (14) to produce a value of 3 for Rows50x'.

The Bank Address Generation circuit of FIG. 10, as part of the address translation circuit 504 of FIGS. 5 and 6, uses the implementation of Equation (4) to produce a value of 3 for Rows10x'. Accordingly, the distance value is 180 (3*50+310).

Consider a first example matrix 302 example wherein the first matrix column to be accessed is matrix column 32 and the first matrix line to be accessed is matrix row 23.

In this case, matrix column 32 can be represented by setting Col40x to 0 and setting Col1x to 32. The value of ColSet 1806 may be determined, as illustrated in FIG. 18, wherein the combination of the value (0) in the Col40x flip-flop 1802, the multiplication operator 1814, the addition operator 1816 and the value (4) resulting from using the value (32) in the Col1x flip-flop 1002 in Equation (3) may be seen to implement an Equation (13) to obtain a value of 5*0+3=3 for the ColSet 1806.

Also in this case, matrix row 23 can be represented by setting Line50x to 0 and Line1x to 23. The value 23 in the Line1x flop-flop 1104 is used by the line-offset MUX 1110-0 to reference the LineOffset-to-Bank lookup table 700 of FIG. 7 to implement Equation (2) to produce a bank output for the final bank column MUX 1108-00. The final bank column MUX 1108-00 uses the final bank output from the final bank row MUX 1106-0 in combination with the bank output from the line-offset MUX 1110-0 to implement Equation (1) and output a bank value 1102-00 for L0/CS0.

Since ColSet 1806 has taken a value of 4, the first line to be accessed in the memory segment 100 is line ColSet*distance=4*180=720. Accordingly, the first column/first line starts at entry 14 (720/50) in Bank 2.

Evaluating Equation (10) involves finding values from step 0, step 1, step 2 and step 3. In this case, step 0 is 0, since both Start50x and Line50x are 0. Step 1 involves determining a product of ColSet (4) and Rows50x' (3). Step 2 involves a table lookup in the Div-50 table 1500 with CS (4) and Rows10x' (3), giving 2. Step 2 also involves determining a product of Col40x (0) and Rows10x' (3), giving 0. Accordingly, the value from step 2 is 2. Step 3 involves a table lookup in the Mod-50 table 1500 with CS (4) and Rows10x' (3), giving 20. Step 3 also involves evaluating the sum of the value (20) found in the Mod-50 table 1500 and Line1x, with the evaluating giving a 0, a 1 or a 2. For the first line, where Line1x is 23, evaluating $\lfloor 43/50 \rfloor$ gives 0. For the last line, where Line1x is 30 (7 more than 23 because of row-major access), evaluating $\lfloor 50/50 \rfloor$ gives 1. Equation (10) may be evaluated to provide a value for the entry to associate with the first line and the last line, as follows:

$1^{st}$Col/$1^{st}$ Line Entry=0 (step 0)+4*3 (step 1)+2 (step 2)+0 (step 3)=14

$1^{st}$Col/Last Line Entry=0 (step 0)+4*3 (step 1)+2 (step 2)+1 (step 3)=15

Accordingly, the entry for the first column and first line is 14.

In the second example matrix 304 of the table 300 of example mappings of matrix elements in FIG. 3, to generate an address for a memory entry, the number of the memory entry is incremented once every 50 lines. The Access Mode for the second example matrix 304 is column-major, which may also be expressed as 32×8E. The Matrix Start Line is 1450, based on the end of the first example matrix 302 occurring just before line 1440. With 1450 as the Matrix Start Line, a value for Start50x may be determined as $$29\left(\frac{1450}{50}\right)$$

The number of matrix rows is 96. Accordingly, the respective values of Rows50x/Rows10x/Rows1x are 1/4/6.

Step 1 of the example entry address generation circuit 1600, illustrated in FIG. 18, as part of the address translation circuit 504 of FIGS. 5 and 6, uses the implementation of Equation (14) to produce a value of 2 for Rows50x'.

The Bank Address Generation circuit of FIG. 10, as part of the address translation circuit 504 of FIGS. 5 and 6, uses the implementation of Equation (4) to produce a value of 1 for Rows10x', since Rows10x is 4. Accordingly, the distance value may be determined to be 110 (2*50+1*10).

Consider a second example matrix 304 example wherein the first matrix column to be accessed is matrix column 56 and the first matrix line to be accessed is matrix row 49.

In this case, matrix column 56 can be represented by setting Col40x to 1 and setting Col1x to 16. The value of ColSet 1806 may be determined, as illustrated in FIG. 18, wherein the combination of the value (1) in the Col40x flip-flop 1802, the multiplication operator 1814, the addition operator 1816 and the value (2) resulting from using the value (16) in the Col1x flip-flop 1002 in Equation (3) may be seen to implement an Equation (13) to obtain a value of 5*1+2=7 for the ColSet 1806.

Also in this case, matrix row 49 can be represented by setting Line50x to 0 and Line1x to 49. The value 49 in the Line1x flop-flop 1104 is used by the line-offset MUX 1110-0 to reference the LineOffset-to-Bank lookup table 700 of FIG. 7 to implement Equation (2) to produce a bank output for the final bank column MUX 1108-00. The final bank column MUX 1108-00 uses the final bank output from the final bank row MUX 1106-0 in combination with the bank output from the line-offset MUX 1110-0 to implement Equation (1) and output a bank value 1102-00 for L0/CS0.

Since ColSet 1806 has taken a value of 7, the first line to be accessed in the memory segment 100 is line Matrix Start Line+ColSet*distance=1450+7*110=2220. Accordingly, the first column/first line starts at entry 44 (29+770/50) in Bank 2.

Evaluating Equation (10) involves finding values from step 0, step 1, step 2 and step 3. In this case, step 0 is 29, since Start50x is 29 and Line50x is 0. Step 1 involves determining a product of ColSet (7) and Rows50x' (2). Step 2 involves a table lookup in the Div-50 table 1500 with Col1x>>3 (2) and Rows10x' (1), giving 0. Step 2 also involves determining a product of Col40x (1) and Rows10x' (1), giving 1. Accordingly, the value from step 2 is 1. Step 3 involves a table lookup in the Mod-50 table 1500 with Col1x/8 (2) and Rows10x' (1), giving 20. Step 3 also involves evaluating the sum of the value (20) found in the Mod-50 table 1500 and Line1x, with the evaluating giving a 0, a 1 or a 2. For the first line, where Line1x is 49, evaluating $\lfloor 69/50 \rfloor$ gives 1. For the last line, where Line1x is 80 (31 more than 49 because of column-major access), evaluating $\lfloor 100/50 \rfloor$ gives 2. Equation (10) may be evaluated to provide a value for the entry to associate with the first line and the last line, as follows:

$$1st\ Col/1st\ Line\ Entry =$$
$$29(\text{step } 0) + 7*2(\text{step } 1) + 1(\text{step } 2) + \left\lfloor \frac{69}{50} \right\rfloor (\text{step } 3) = 45$$

$$1st\ Col/\text{Last Line Entry} =$$
$$29(\text{step } 0) + 7*2(\text{step } 1) + 1(\text{step } 2) + \left\lfloor \frac{100}{50} \right\rfloor (\text{step } 3) = 46$$

Accordingly, the entry for the first column and first line is 45.

Providing ultra-high throughput, non-blocking, concurrent Read/Write Data Accesses for a large number of Requestors 500/600 (FIG. 5, FIG. 6), which providing may be accomplished by implementing aspects of the present application, may be shown to ensure that a High-Performance, Domain-Specific, Accelerator is seldom, if ever, ever starved. As will be understood, starving an accelerator means the accelerator has no data to process, hence the accelerator idles, not doing anything useful.

Conveniently, implementing aspects of the present application support 1-D or 2-D Data Array Accesses, both row-major and column-major, in a single cycle.

Furthermore, implementing aspects of the present application may be shown to support Unified Memory Address space for all Requestors 500/600 (FIG. 5, FIG. 6) and, thereby, provide flexibility in software development.

It should be appreciated that one or more steps of the methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of memory access, the method comprising:
establishing an addressing scheme for a memory segment, the addressing scheme defining:
  a plurality of memory tiles, each memory tile among the plurality of memory tiles designated as belonging to:
    a memory bank among a plurality of memory banks; and
    a memory sub-bank among a plurality of memory sub-banks;
  a plurality of memory entries, each memory entry among the plurality of memory entries extending across the plurality of memory tiles;
  each memory tile among the plurality of memory tiles having plurality of memory lines that are associated with a respective memory entry of the plurality of memory entries; and
  each memory line among the plurality of memory lines having a plurality of memory elements, wherein each memory element is a one-dimensional memory structure;
selecting, using the addressing scheme, a memory element among the plurality of memory elements in a first memory line among the plurality of memory lines, in a first entry of the plurality of memory entries, of a first memory tile in a first memory bank and a first memory sub-bank, thereby establishing a first selected memory element;
selecting, using the addressing scheme, a memory element among the plurality of memory elements in a second memory line among the plurality of memory lines, in the first entry, of a second memory tile in a second memory bank, thereby establishing a second selected memory element; and
in a single clock cycle:
  accessing the first selected memory element as a first memory element f-G-F storing a first matrix element among a plurality of matrix elements, a quantity of matrix elements in the plurality of matrix elements being equivalent to a quantity of memory elements in the plurality of memory elements in each memory line; and accessing the second selected memory element as a second memory element storing a second matrix element among a second plurality of matrix elements.

2. The method of claim 1 further comprising:

accessing, using the addressing scheme, a memory element, among the plurality of memory elements in a first line of the plurality of memory lines, in the first entry, of a third memory tile, to store a third matrix element; and accessing, using the addressing scheme, a memory element, among the plurality of memory elements in a second line of the plurality of memory lines in the first entry, of the third memory tile, to store a fourth matrix element.

3. The method of claim 2 wherein:

the third memory tile is designated in the first memory bank; and the third memory tile is designated in a second memory sub-bank among the plurality of memory sub-banks.

4. The method of claim 3 further comprising, after accessing all memory lines in all memory tiles in the first memory bank:

accessing, using the addressing scheme, a memory element, among the plurality of memory elements in a first line of the plurality of memory lines, in the first entry, of a subsequent memory tile, to store a subsequent matrix element;

accessing, using the addressing scheme, a memory element, among the plurality of memory elements in a second line of the plurality of memory lines in the first entry, of the subsequent memory tile, to store another subsequent matrix element;

the subsequent memory tile is designated in the second memory bank among the plurality of memory banks; and the subsequent memory tile is designated in the first memory sub-bank.

5. The method of claim 1, where all accesses are completed within a single memory access clock cycle.

6. An address translation circuit for memory access, the address translation circuit comprising:

a processor adapted to:

establish an addressing scheme for a memory segment, the addressing scheme defining:

a plurality of memory tiles, each memory tile among the plurality of memory tiles designated as belonging to:

a memory bank among a plurality of memory banks; and a memory sub-bank among a plurality of memory sub-banks;

a plurality of memory entries, each memory entry among the plurality of memory entries extending across the plurality of memory tiles;

each memory tile among the plurality of memory tiles having plurality of memory lines that are associated with a respective memory entry of the plurality of memory entries; and each memory line among the plurality of memory lines having a plurality of memory elements, wherein each memory element is a one-dimensional memory structure;

select, using the addressing scheme, a memory element among the plurality of memory elements in a first memory line among the plurality of memory lines, in a first entry of the plurality of memory entries, of a first memory tile in a first memory bank and a first memory sub-bank, thereby establishing a first selected memory element;

select, using the addressing scheme, a memory element among the plurality of memory elements in a second memory line among the plurality of memory lines, in the first entry, of a second memory tile in a second memory bank, thereby establishing a second selected memory element; and in a single clock cycle:

access the first selected memory element as a first memory element storing a first matrix element among a plurality of matrix elements, a quantity of matrix elements in the plurality of matrix elements being equivalent to a quantity of memory elements in the plurality of memory elements in the each memory line; and access the second selected memory element as a second memory element storing a second matrix element among a second plurality of matrix elements.

7. The address translation circuit of claim 6 wherein the processor is further adapted to:

access, using the addressing scheme, a memory element among the plurality of memory elements in a first line of the plurality of memory lines, in the first entry, of a third memory tile, to store a third matrix element; and access, using the addressing scheme, a memory element among the plurality of memory elements in a second line of the plurality of memory lines, in the first entry, of the third memory tile, to store a fourth matrix element.

8. The address translation circuit of claim 7 wherein:

the third memory tile is designated in the first memory bank; and the third memory tile is designated in a second memory sub-bank among the plurality of memory sub-banks.

9. The address translation circuit of claim 8 wherein the processor is further adapted to, after accessing all memory lines in all memory tiles in the first memory bank:

access, using the addressing scheme, a memory element among the plurality of memory elements in a first line of the plurality of memory lines, in the first entry, of a subsequent memory tile, to store a subsequent matrix element;

access, using the addressing scheme, a memory element among the plurality of memory elements in a second line of the plurality of memory lines in the first entry, of the subsequent memory tile, to store another subsequent matrix element;

wherein the subsequent memory tile is designated in the second memory bank among the plurality of memory banks; and wherein the subsequent memory tile is designated in the first memory sub-bank.

10. The address translation circuit of claim 6 wherein the processor is further adapted to complete all accesses within a single memory access clock cycle.

11. A non-transitory computer-readable medium storing instructions, wherein executing the instructions causes a processor to:

establish an addressing scheme for a memory segment, the addressing scheme defining:

a plurality of memory tiles, each memory tile among the plurality of memory tiles designated as belonging to:

a memory bank among a plurality of memory banks; and a memory sub-bank among a plurality of memory sub-banks;

a plurality of memory entries, each memory entry among the plurality of memory entries extending across the plurality of memory tiles;

each memory tile among the plurality of memory tiles having plurality of memory lines that are associated with a respective memory entry of the plurality of memory entries; and each memory line among the plurality of memory lines having a plurality of memory elements, wherein each memory element is a one-dimensional memory structure;

select, using the addressing scheme, a memory element among the plurality of memory elements in a first memory line among the plurality of memory lines, in a first entry of the plurality of memory entries, of a first memory tile in a first memory bank and a first memory sub-bank, thereby establishing a first selected memory element;

select, using the addressing scheme, a memory element among the plurality of memory elements in a second memory line among the plurality of memory lines, in the first entry, of a second memory tile in a second memory bank, thereby establishing a second selected memory element; and in a single clock cycle:
  access the first selected memory element as a first memory element storing a first matrix element among a plurality of matrix elements, a quantity of matrix elements in the plurality of matrix elements being equivalent to a quantity of memory elements in the plurality of memory elements in the each memory line; and
  access the second selected memory element as a second memory element storing a second matrix element among a second plurality of matrix elements.

* * * * *